United States Patent
Candida et al.

(10) Patent No.: US 12,077,332 B2
(45) Date of Patent: Sep. 3, 2024

(54) APPARATUS AND PROCESS FOR MAKING SUPPORTS OR PACKAGES, AND PACKAGING APPARATUS AND PROCESS

(71) Applicant: Cryovac, LLC, Charlotte, NC (US)

(72) Inventors: Giovanni Candida, Milan (IT); Giulio Benedetti, Solbiate Arno (IT)

( * ) Notice: Subject to any disclaimer, the term of this patent is extended or adjusted under 35 U.S.C. 154(b) by 561 days.

(21) Appl. No.: 17/283,393

(22) PCT Filed: Oct. 7, 2019

(86) PCT No.: PCT/EP2019/077015
§ 371 (c)(1),
(2) Date: Apr. 7, 2021

(87) PCT Pub. No.: WO2020/074411
PCT Pub. Date: Apr. 16, 2020

(65) Prior Publication Data
US 2021/0380287 A1    Dec. 9, 2021

(30) Foreign Application Priority Data

Oct. 11, 2018 (EP) .................... 18199965

(51) Int. Cl.
| | |
|---|---|
| *B65B 5/04* | (2006.01) |
| *B29C 51/08* | (2006.01) |
| *B29C 51/26* | (2006.01) |
| *B65B 5/02* | (2006.01) |
| *B65B 9/04* | (2006.01) |
| *B65B 41/02* | (2006.01) |

(Continued)

(52) U.S. Cl.
CPC ............... *B65B 5/02* (2013.01); *B29C 51/08* (2013.01); *B29C 51/261* (2013.01); *B29C 51/264* (2013.01); *B65B 5/04* (2013.01); *B65B 9/04* (2013.01); *B65B 41/02* (2013.01); *B65B 47/02* (2013.01); *B65B 57/08* (2013.01); *B65B 61/06* (2013.01); *B65B 65/003* (2013.01); *B29L 2031/712* (2013.01)

(58) Field of Classification Search
None
See application file for complete search history.

(56) References Cited

U.S. PATENT DOCUMENTS

| | | | |
|---|---|---|---|
| 2,762,720 A | 9/1956 | Michel | |
| 3,673,760 A * | 7/1972 | Canamero | ............... B65B 9/042 53/511 |

(Continued)

FOREIGN PATENT DOCUMENTS

| | | |
|---|---|---|
| CN | 107810142 A1 | 3/2018 |
| DE | 102015105175 A1 | 10/2016 |

(Continued)

*Primary Examiner* — Chinyere J Rushing-Tucker
(74) *Attorney, Agent, or Firm* — Jon M. Isaacson

(57) ABSTRACT

An apparatus includes a supplying station to receive a feed roll and to rotate it to unroll consecutive portions of plastic film; and a cutting station to separate, from an unrolled portion of plastic film, either a strip or a plurality of distinct film sheets obtained from a same strip shaped portion. The strip or the strip shaped portion have a width and a length, where the width of said strip shaped portion is larger than the length of the same strip shaped portion. The apparatus also includes a thermoforming station and/or a packaging station.

18 Claims, 9 Drawing Sheets

(51) Int. Cl.
*B65B 47/02* (2006.01)
*B65B 57/08* (2006.01)
*B65B 61/06* (2006.01)
*B65B 65/00* (2006.01)
B29L 31/00 (2006.01)

(56) References Cited

U.S. PATENT DOCUMENTS

| | | | |
|---|---|---|---|
| 3,874,143 A * | 4/1975 | Braber | B65D 75/327 |
| | | | 53/133.8 |
| 6,476,137 B1 | 11/2002 | Longo | |
| 6,623,821 B1 | 9/2003 | Kendig | |
| 7,803,416 B2 | 9/2010 | Roveda et al. | |
| 2017/0320259 A1* | 11/2017 | Mondini | B29C 51/46 |
| 2018/0017893 A1 | 6/2018 | Palumbo et al. | |
| 2020/0207496 A1* | 7/2020 | Schwab | B29C 51/268 |

FOREIGN PATENT DOCUMENTS

| | | |
|---|---|---|
| EP | 690012 A1 | 1/1996 |
| EP | 1529797 A1 | 5/2005 |
| EP | 3241663 A1 | 11/2017 |
| WO | 2007093495 A1 | 8/2007 |
| WO | 2011151374 A1 | 12/2011 |
| WO | 2016140758 A1 | 9/2016 |
| WO | 2018122765 A1 | 7/2018 |

* cited by examiner

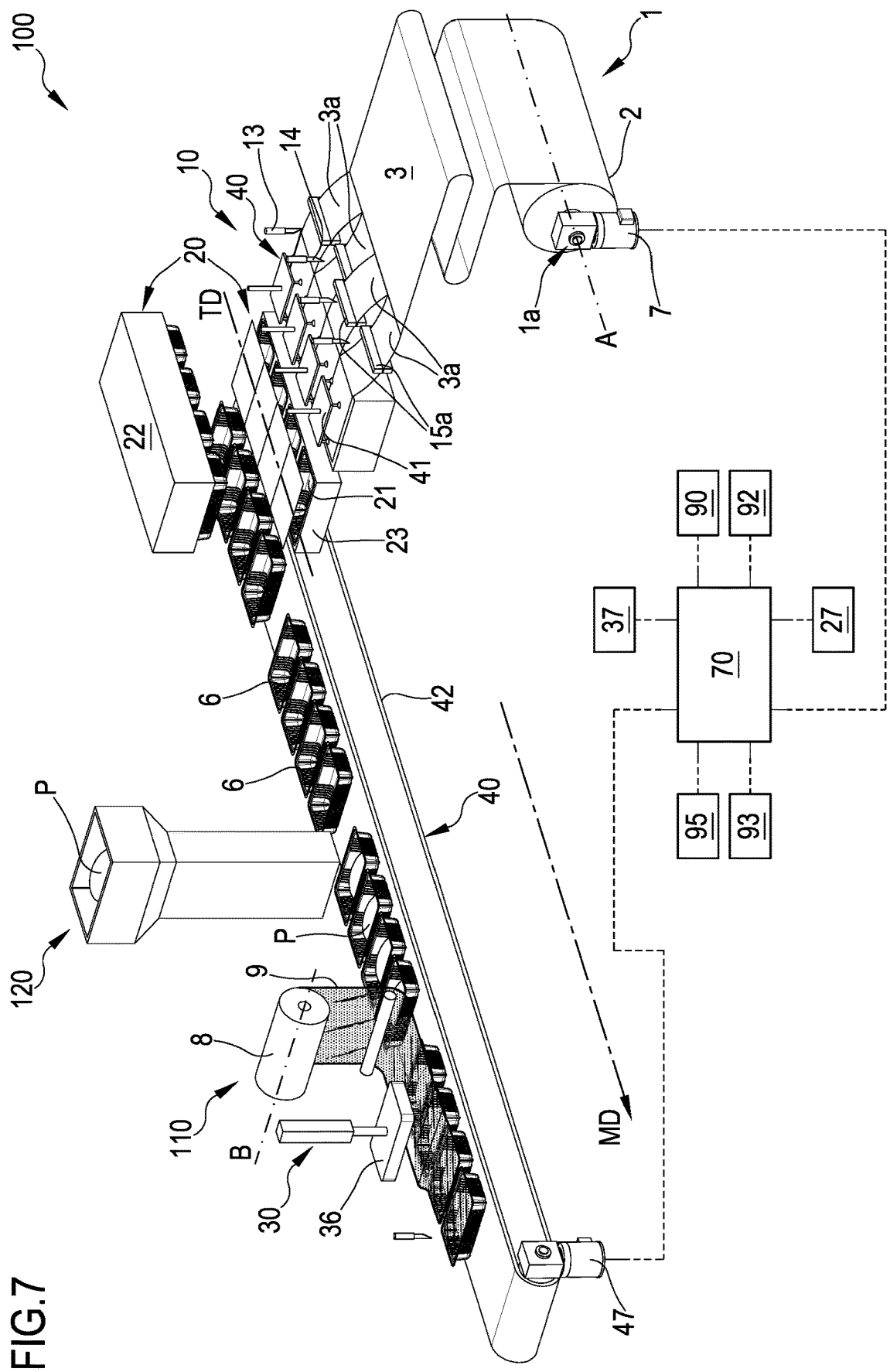

APPARATUS AND PROCESS FOR MAKING SUPPORTS OR PACKAGES, AND PACKAGING APPARATUS AND PROCESS

FIELD OF THE INVENTION

The present invention refers to an apparatus for making supports for use in packaging or for making packages intended to house one or more products, in particular food-type products. The invention also refers to a thermoforming process to make said supports and to a process for making said packages; the package comprises a plastic support bearing the product which is sealed by a plastic film. The invention also may find particular application in vacuum packaging or in a controlled atmosphere packaging of products of various kinds.

STATE OF THE ART

Several different apparatuses and related methods/processes are known for packaging articles like food products positioned on a support and then closed by a closure film.

In particular, packaging systems are known wherein a continuous plastic "bottom" film is unrolled along a machine working direction and subjected to thermoforming thereby defining a continuous precursor body having a plurality of cavities. The cavities in the precursor body receive corresponding products and are sealed by a top plastic film to make a plurality of packages: the bottom and top plastic films are then cut to create separate finished packages.

In an alternative solution, a cutting station, placed upstream with respect to a thermoforming station, cuts discrete portions from a plastic film and moves the film sheets to the thermoforming station; the thermoformed supports, which may be in the form of trays or flat supports, are then transferred to the subsequent packaging station where the tray or support receives a closure film.

US20170320259A1 patent application shows an apparatus for thermoforming plastic containers; the apparatus comprises a feeder for supplying discrete film sheets of thermoformable plastic material to a conveyor. A transferring device is designed to simultaneously transfer the plurality of film sheets, arranged on the conveyor, to the thermoforming moulds. The feeder comprises a feed roll turning around an unwinding axis to provide subsequent portions of plastic film to a cutting station defining the consecutive flat sheets by transversally cutting an unrolled portion of plastic film. Each single transversal cut produces a single flat sheet having the same width of the unrolled portion of plastic film.

A plurality of drawbacks affect the currently known apparatuses.

First, plastic films used for the formation of the supports or trays are relatively thick, in the sense that they present thickness significantly higher than that of the plastic closure films used for sealing the package. This circumstance leads either to the need of handling big feed rolls having very large diameters or to the drawback of reduced time intervals between subsequent feed reel replacements. Large diameter rolls, on the other hand, cause problems in terms of handling, space management and rotation control of the feed roll during operation. On the other hand, as mentioned, intrinsic limitations in terms of maximum roll diameter may result in frequent feed roll replacements. Looking at the feed roll disclosed in US20170320259A1, it is clear that the only way to increase time intervals between subsequent feed roll replacements is to increase the roll diameter, since the width of the feed roll is laterally limited by the size of each single flat sheet. Moreover, each cut defines a single flat sheet, leading to several stops during the feed roll unwinding condition, therefore affecting the overall production speed.

AIM OF THE INVENTION

The object of the present invention is to solve at least one of the drawbacks and/or limitations of the prior art.

A first object of the invention is to provide a packaging apparatus and process of compact size.

Another object of the invention is to provide a packaging apparatus and process entailing longer time intervals between subsequent feed roll replacements.

A further object of the invention is to provide a packaging apparatus and process which combines relative small size with a high production yield.

An ancillary objective of the invention is to provide a packaging apparatus and process characterized by high production speed and reduced material scrap.

A further ancillary object is providing a packaging apparatus and process resulting in a more controlled unrolling of the plastic film from a feed roll serving the apparatus/process.

SUMMARY SECTION

A 1st aspect refers to an apparatus (100) for manufacturing plastic supports (6) and/or packages (80), wherein the apparatus comprises a supplying station (1) comprising a roll support (1a) configured to receive a feed roll (2) and to rotate the feed roll (2) around a respective unwinding axis (A) to unroll consecutive portions of plastic film (3).

In a 2nd aspect according to the previous aspect, the apparatus (100) comprises a cutting station (10) configured for carrying out a cutting procedure comprising separating, from an unrolled portion of plastic film (3) coming from the feed roll (2), either a strip (4) of plastic film (3) having a width, measured parallel to the unwinding axis (A), and a length, measured perpendicular to the unwinding axis (A), wherein the width of said strip (4) is larger than the length of the same strip (4);

or a plurality of distinct film sheets (5) obtained from a same strip shaped portion (400) of plastic film (3), said strip shaped portion (400) having a width, measured parallel to the unwinding axis (A), and a length, measured perpendicular to the unwinding axis (A), wherein width of said strip shaped portion (400) is larger than the length of the same strip shaped portion (400).

In a 3rd aspect according to any of the preceding aspects, the apparatus (100) comprises a thermoforming station (20) comprising a plurality of adjacent moulds (21) configured for receiving the strips (4) or the plurality of distinct film sheets (5), and thermoforming said strips (4) or said plurality of distinct film sheets (5) in order to form a plurality of plastic supports (6).

In a 4th aspect according to any of the preceding aspects, the apparatus (100) comprises a packaging station (30) configured for closing in a package (80) at least one product (P) positioned on at least one between said strips (4), film sheets (5) or plastic supports (6).

In a 5th aspect according to any of the preceding aspects from 2 to 4, the width of said strip (4) is at least twice than the length of the same strip (4), optionally the strip (4) and/or the plurality of distinct film sheets (5) presenting a rectangular shape; or wherein the width of the strip shaped portion (400) is at least twice than the length of the same strip shaped portion (400), optionally the strip shaped portion (400) and/or the plurality of distinct film sheets (5) presenting a rectangular shape.

In a 6th aspect according to any of the preceding aspects, the apparatus (100) comprises the feed roll (2) mounted on the roll support (1*a*).

In a 7th aspect according to the previous aspect, the feed roll (2) has, at least in an initial condition, at least 500 meters of rolled plastic film (3), optionally between 500 and 2400 meters of rolled plastic film.

In a 8th aspect according to aspects 6 or 7, the feed roll (2) has, at least in an initial condition, a radius of at least 300 mm, optionally a radius between 300 and 500 mm.

In a 9th aspect according to any of the preceding aspects from 6 to 8, the feed roll (2) has, at least in an initial condition, a width measured parallel to the unwinding axis (A), of at least 600 mm, optionally has a width measured parallel to the unwinding axis (A) between 600 and 1200 mm.

In a 10th aspect according to the previous aspect, said width is larger, optionally at least 1.5 times, than the radius of the feed roll (2).

In an 11th aspect according to any of the preceding aspects, the plastic film (3) of the feed roll (2) of the supplying station (1) has a thickness comprised between 200 and 800 µm.

In an 12th aspect according to any of the preceding aspects, each unrolled portion of plastic film (3) provided by the feed roll (2) has a width, measured parallel to the unwinding axis (A), which is
equal to the width of the strip (4) and preferably equal to the width of the feed roll (2) or
equal to the width of the strip shaped portion (400) and preferably equal to the width of the feed roll (2).

In an 13th aspect according to any of the preceding aspects from 3 to 12, the apparatus comprises the thermoforming station (20), with the plurality of moulds (21) sequentially arranged to form a line of moulds positioned along a thermoforming direction (TD), which is oriented parallel to the feed roll unwinding axis (A).

In a 14th aspect according to any of the preceding aspects from 2 to 13, the cutting procedure, which the cutting station (10) is configured to execute, is designed such that the width of the strips (4) of plastic film (3) is sized to completely cover the longitudinal extension, in the thermoforming direction (TD), of said line of moulds (21).

In a 15th aspect according to any of the preceding aspects from 2 to 14, the cutting procedure, which the cutting station (10) is configured to execute, is designed such that the length of the strips (4) of plastic film (3) is sized to completely cover the lateral extension, perpendicularly to the thermoforming direction (TD), of said line of moulds (21).

In a 16th aspect according to any of the preceding aspects from 3 to 15, the apparatus (100) comprises both the packaging station (30) and the thermoforming station (20), wherein the packaging station (30) is arranged downstream with respect to the thermoforming station (20) along a machine direction (MD) of transportation of the plastic supports (6) to the packaging station (30).

In a 17th aspect according to the previous aspect, the unwinding axis (A) of the feed roll (2) is parallel to the machine direction (MD).

In an 18th aspect according to any of the preceding aspects, the apparatus comprises at least one conveyor (40) configured to move the strips (4) or the plurality of distinct film sheets (5) from the cutting station (10) to at least one between:
the thermoforming station (20); and
the packaging station (30).

In a 19th aspect according to the previous aspect, the apparatus comprises the thermoforming station (20), the conveyor (40) presenting a first conveying line (41) arranged between the cutting station (10) and the thermoforming station (30) and configured to move the strips (4) or the plurality of distinct film sheets (5) from the cutting station (10) to the thermoforming station (20).

In a 20th aspect according to any of the preceding aspects, the apparatus (100) comprises both the thermoforming station (20) and the packaging station (30).

In a 21st aspect according to any of the preceding aspects from 18 to 20, the conveyor (40) comprises a second conveying line (42), arranged between the thermoforming station (20) and the packaging station (30), configured to move the plastic support (6) from the thermoforming station (20) to the packaging station (30), wherein said second conveying line (42) is configured to move the plastic supports (6) parallel to the machine direction (MD).

In a 22nd aspect according to any of the preceding aspects from 2 to 21, the cutting procedure, performed by the cutting station (10), comprises making, on the unrolled portion, at least one cut or notch parallel to the unwinding axis (A) of the feed roll (2).

In a 23rd aspect according to the previous aspect, said cut or notch extends along the entire width of the unrolled portion of plastic film (3) to define said strip (4), the first conveying line (41) being configured to move the strip (4) from the cutting station (10) to the thermoforming station (20).

In a 24th aspect according to any of the preceding aspects from 2 to 21, the cutting procedure performed by the cutting station (10) comprises first making, on the unrolled portion, at least one cut or notch parallel to the unwinding axis (A) of the feed roll (2), said cut or notch extending along the entire width of the unrolled portion of plastic film (3) to define said strip (4), and then making on said strip (4), one or more further cuts or notches having a major part perpendicular to the unwinding axis (A) of the feed roll (2).

In particular, said further cuts or notches define said plurality of film sheets (5) on each strip (4), as shown in FIG. 3. In accordance with a possible optional form of execution, the shape of each one of said further cuts or notches is that of a straight line (FIG. 3) or that of a straight line with terminal portions which are either inclined (e.g. at 45° relative to the same straight line) or rounded (e.g. in the form of an arc of circle as shown in FIG. 3A) such that each of the film sheets (5) presents the shape of a rectangle or of a square (FIG. 3) or that of a rectangle or square (FIG. 3A) with rounded corners or with corners formed by a joining edge at an angle (e.g. at) 45° relative to two adjacent sides the film sheet.

The further cuts or notches may be obtained using:
a blade or a cutter having straight conformation or operative along a straight line 14 (as shown in FIG. 3) which thus forms straight further cuts or notches and consequently film sheets in the form of perfect rectangles or squares; or
a blade or cutter 14 having a central straight major portion forming a straight cutting segment and opposite end portions forming inclined or curved cutting lines to thereby obtain film sheets in the form of rectangles or squares with rounded or inclined corner regions, as shown in FIG. 3A; in this second case each blade 14 may comprise a single central straight major portion and, at each of the two opposite end portions, two diverging inclined or curved cutting portions to thereby form at each cut the curved of inclined corner regions of adjacent film sheets (5).

It is noted that the blade or cutter (14) described in this 24th aspect is also identified herein as second blade tool, as it is configured for making cuts oriented generally transverse, preferably perpendicular, to unwinding axis (A).

In a 25th aspect according to the previous aspect, the first conveying line (41) is configured to move each one of the plurality of film sheets (5) from the cutting station (10) to the respective moulds (21) in the thermoforming station (20).

In a 26th aspect according to any of the preceding aspects from 2 to 21, which is for example shown in FIGS. 1, 5 and 5A, the cutting procedure performed by the cutting station (10) comprises first making, on the unrolled portion, at least one or more cuts or notches perpendicular to the unwinding axis (A) of the feed roll (2) to form a plurality of ribbons (3a), and then making, on each of said plurality of ribbons (3a), one or more further cuts or notches having a major part extending parallel to the unwinding axis (A) of the feed roll (2).

In particular, said further cuts or notches practiced on each of said ribbons (3a) may extend along the entire width of each ribbon (and thus cover the width of the unrolled portion of plastic film (3) in a direction generally parallel to the unwinding axis (A)) to define said plurality of film sheets (5).

In accordance with a possible optional form of execution, the shape of each one of said further cuts or notches is that of a straight line (FIG. 5) or that of a straight line with terminal portions which are either inclined (e.g. at 45° relative to the same straight line) or rounded (e.g. in the form of an arc of circle) such that each of the film sheets presents the shape of a rectangle or of a square with rounded corners or with corners formed by a joining edge at an angle (e.g. at 45°) relative to two adjacent sides the film sheet, as shown in FIG. 5A.

The further cuts or notches may be obtained using:
- a blade or a cutter (13) having straight conformation or operative along a straight line (as shown in FIG. 5) which thus forms straight further cuts or notches and consequently film sheets in the form of perfect rectangles or squares; or
- a blade or cutter (13) having a central straight major portion forming a straight cutting segment and opposite end portions forming inclined or curved cutting lines to thereby obtain film sheets in the form of rectangles or squares with rounded or inclined corner regions, as shown in FIG. 5A; in this second case each blade (13) may comprise a single central straight major portion and, at each one of the two opposite end portions, two diverging inclined or curved cutting portions to thereby form at each cut the curved of inclined corner regions of adjacent film sheets (5).

It is noted that the blade or cutter (13) described in this 26th aspect is also identified herein as first blade tool, as it is configured for making cuts oriented generally parallel to unwinding axis (A).

In a 27th aspect according to the previous aspect, the first conveying line (41) is configured to move each film sheet (5) of the plurality of film sheets (5) from the cutting station (10) to the respective mould (21) in the thermoforming station (20). In a 28th aspect according to any of the preceding aspects, the apparatus (100) includes a control unit (70) configured to command the cutting station (10) to execute the cutting procedure.

In a 29th aspect according to any of the preceding aspects from 2 to 28, at least in a configuration wherein the cutting procedure performed by the cutting station (10) comprises first making, on the unrolled portion, at least one or more cuts or notches perpendicular to the unwinding axis (A) of the feed roll (2) to form a plurality of ribbons (3a), and then making, on each of said plurality of ribbons (3a), one or more further cuts or notches having a major part extending parallel to the unwinding axis (A) of the feed roll (2), the cutting station (10) comprises at least one guide (15) configured to offset said ribbons (3a) such that adjacent ribbons or ribbon portions are arranged on different paths.

In an aspect 29A according to any of the preceding aspects from 2 to 29, the cutting station (10) comprises a guide (15) configured to vertically and/or horizontally offset said ribbons (3a) such that adjacent ribbons or at least portions of adjacent ribbons are arranged on non-parallel paths; in the example of FIG. 1 the guide is configured to vertically offset portions of adjacent the ribbons (3a) such that adjacent ribbons take different trajectories at least for a portion of their path thereby facilitating separation.

In a 30th aspect according to the previous aspect, the guide (15) comprises a plurality of adjacent guide members, for example a plurality of adjacent guide rollers (15a), extending parallel to the unwinding axis (A), each guide roller (15a) being active on a respective of said ribbons and being vertically and/or horizontally shifted with respect to an adjacent guide roller (15a). In the non-limiting example of FIG. 1, the plurality of guide rollers are positioned each one at a vertical height different from the height of the next adjacent guide member or roller, with the first and third guide member or roller being the same height and the second and fourth guide member or roller being at the same height different from that of the first and third guide member or roller.

In a 31st aspect according to any of the preceding aspects from 19 to 30, the first conveying line (41) of the conveyor (40) comprises a vacuum plate (44) presenting a plurality of openings fluidly communicating with a vacuum source configured to define, at least in an apparatus working condition, a pressure at a face of the vacuum plate (44) lower than the atmosphere pressure.

In a 32nd aspect according to the previous aspect, the vacuum plate (44) is configured to engage the strip (4) or the plurality of film sheets (5) and to move it or them from the cutting station (10) to the thermoforming station (20).

In a 33rd aspect according to any of the preceding aspects, the cutting station (10) comprises a first and second blade tool (13, 14), wherein:
- the first blade tool (13) is configured for sequentially separating strips (4) or strips shaped portions (400) from an unrolled portion of plastic film (3);
- the one or more second blade tool (14) is arranged perpendicular to the feed roll unwinding axis (A) and configured for defining the plurality of film sheets (5) from a same plastic strip shaped portion (400).

In a possible optional form of execution, the first and/or the second blade tool may comprise:
- a straight blade or cutter forming cuts or notches having the shape of a straight line
- may be shaped to form cuts or notches in the form of a straight line with terminal portions which are either inclined (e.g. at 45° relative to the same straight line) or rounded (e.g. in the form of an arc of circle) such that each of the film sheets presents the shape of a rectangle or of a square with rounded corners or with corners formed by a joining edge at an angle (e.g. at 45°) relative to two adjacent sides the film sheet.

In a 34th aspect according to any of the preceding aspects from 3 to 33, each mould (21) of the plurality of moulds (21) is configured to thermoform at least one between the strip (4) and the distinct film sheets (5) to make respective plastic supports (6), the plastic supports (6) being in the form of trays presenting an inner concavity configured for receiving at least one product (P).

In a 35th aspect according to any of the preceding aspects from 3 to 34, the moulds (21) comprises at least a heating source configured to allow plastic deformation of the strips (4) or of the plurality of distinct film sheets (5) to obtain said supports (6).

In a 36th aspect according to any of the preceding aspects from 3 to 35, the plurality of moulds of the thermoforming station (20) presents a length, measured perpendicularly to the thermoforming direction (TD), said length being equal to or lower than:
the length of the strips (4) of plastic film (3); or
the length of the plurality of distinct film sheets (5).

In a 37th aspect according to any of the preceding aspects from 3 to 36, the thermoforming station (20) comprises at least an upper and a lower tool (22, 23), movable one respect to the other between:
an open position, wherein the upper and the lower tools (22, 23) are distanced and the moulds (21) are configured to receive the strip (4) or the plurality of distinct film sheets (5); and
a closed position, wherein the upper and the lower tools (22, 23) are approached, optionally in contact, defining an inner volume to allow for thermoforming the plastic film (3).

In a 38th aspect according to any of the preceding aspects, the strip (4) or the plurality of film sheets (5) obtained by the plastic film (3) are intended to define bottom portions of the package (80).

In a 39th aspect according to any of the preceding aspects, the apparatus further comprises an additional supplying station (110) arranged between the thermoforming station (20) and the packaging station (30), said additional supplying station (110) being configured to provide consecutive portions of top plastic film (9) to the packaging station (30) to package the at least one product (P).

In a 40th aspect according to the previous aspect, the additional supplying station (110) comprises a feed roll (8) configured to rotate around a respective unwinding axis (B) to unroll consecutive portions of plastic film (9) in the form of a continuous web, said continuous web being configured to engage with the plastic supports (6) or with the plurality of film sheets (5) or with strips (4) to define a sealed package (80) containing the at least one product (P).

In a 41st aspect according to the previous aspect, the plastic film (9) of the additional supplying station (110) has a thickness lower than the one of the plastic film (3) provided by the supplying station (1).

In a 42nd aspect according to aspect 39, the additional supplying station (110) is configured to provide consecutive portions of plastic film (9) in the form of distinct film sheets (9a), said distinct film sheets (9a) being configured to engage with the plastic supports (6) or with the plurality of film sheets (5) or with strips (4) to define a sealed package (80) containing the at least one product (P).

In a 43rd aspect according to the previous aspect, the plastic film (9) of the additional supplying station (110) has a thickness lower than the one of the plastic film (3) provided by the supplying station (1).

In a 44th aspect according to any of the preceding aspects from 39 to 43, the plastic film (9) of the additional supplying station (110) has a thickness comprised between 10 and 200 μm.

In a 45th aspect according to any of the preceding aspects, the apparatus comprises a sensor (90) associated to the feed roll (2) of the supplying station (1), said sensor (90) being configured for emitting a representative signal of at least one between:
an angular rotation of the feed roll (2);
an angular speed of the feed roll (2);
an advancement of the plastic film (3) exiting the feed roll (2);
a speed of the plastic film (3) exiting the feed roll (2);
an acceleration of the plastic film (3) exiting the feed roll (2);
a length of plastic film (3) unrolled portions;
optionally wherein the sensor (90) associated to the feed roll (2) of the supplying station (1) comprises at least one between an encoder, an optical sensor, a potentiometer, and a variable electric resistance.

In a 46th aspect according to any of the preceding aspects from 3 to 45, the thermoforming station (20) comprises at least one position sensor (92) configured for emitting at least a representative signal of the upper or lower tools (22, 23) position or of the relative position thereof.

In a 47th aspect according to any of the preceding aspects from 18 to 46, the apparatus comprises a conveyor sensor (95) associated to the conveyor (40), said sensor (95) being configured for emitting at least a representative signal of at least one between a position, a speed and an acceleration of the conveyor, optionally said sensor (95) being configured for emitting at least a representative signal of at least one between a position, a speed and an acceleration of the plastic supports (6), the strips (4) or of the film sheets (5).

In a 48th aspect according to any of the preceding aspects, the apparatus comprises a control unit (70) connected to one or more, preferably all said sensors, and active on the supplying station (1), on the cutting station (10), on the thermoforming station (20) and on the conveyor (40).

In a 49th aspect according to any of the preceding aspects, the apparatus comprises a control unit (70) configured for commanding the advancement of the plastic film (3) by controlling the supplying station (1) and synchronizing the cutting procedure according to the plastic film (3) advancement.

In a 50th aspect according to any of the preceding aspects, the supplying station (1) comprises a motor (7) configured to rotate the feed roll (2) around the unwinding axis (A) to unroll consecutive portions of plastic film (3).

In a 51st aspect according to the preceding aspect, the control unit (70) is configured for receiving the representative signal emitted by the sensor (90) of the feed roll (2), said signal representing the advancement of the plastic film (3) exiting the feed roll (2).

In a 52nd aspect according to aspects 50 or 51, the control unit (70) is configured for commanding advancements of the plastic film (3) from the supplying station (1) towards the cutting station (10) by controlling in rotation the motor (7) of the supplying station (1).

In a 53rd aspect according to aspects 50, 51 or 52, the control unit (70) is configured for evaluating the advancement of the unrolled portion of plastic film (3) based on said representative signal, wherein each predetermined advancement is substantially equal to the length of the strip (4).

In a 54th aspect according to any of the aspects from 50 to 53, the control unit (70) is configured for, once achieved a predetermined advancement of the plastic film (3), stopping the advancement of the plastic film (3) by controlling in rotation the motor (7) of the supplying station (1) and commanding the cutting procedure to be executed by the cutting station (10), wherein the length of the strip (4) is equal to said predetermined advancement.

In a 55th aspect according to any of the preceding aspects, the control unit (70) is configured to control the motor (7) of the supplying station (1) to unwind sequential portions of plastic film (3) from the feed roll (2) of the supplying station (1) according to a stepwise advancement.

In a 56th aspect according to the preceding aspect, said stepwise advancement comprises:
- a rest condition, wherein the plastic film (3) is stopped and the cutting station (10) is configured to perform the cutting procedure; and
- a motion condition, wherein the plastic film (3) advances towards the cutting station (10) by a length substantially equal to the length of a strip (4).

In a 57th aspect according to any of the preceding aspects, the supplying station (1) comprises at least one driving roll (101) connected to a motor (7) of the supplying station (1), said motor (7) being configured to put in rotation said driving roll (101), the driving roll (101) being arranged substantially parallel to the unwinding axis (A) of the feed roll (2) and configured to contact, at least in an operative condition of the apparatus (100) and when the feed roll (2) is mounted on the roll supports (1a), to the feed roll (2).

In a 58th aspect according to the preceding aspect, the at least one driving roll (101) presents a lateral surface which is configured to contact with a lateral surface of the feed roll (2).

In a 59th aspect according to the preceding aspects 57 and 58, the at least one driving roll (101) is configured to put in rotation the feed roll (2) to unwind consecutive portions of plastic film (3).

In a 60th aspect according to aspects 57, 58 or 59, the at least one driving roll (101) is movable towards and away from the feed roll (2), optionally towards and away from the unwinding axis (A) of the feed roll (2), to compensate the reduction of the feed roll (2) diameter during unwinding of the plastic film (3).

A 61st aspect refers to a process of manufacturing plastic packages (80), optionally using the apparatus (100) of any of the preceding aspects, comprising at least the following steps:
- unrolling consecutive portions of plastic film (3) by rotating the feed roll (2) around the respective unwinding axis (A);
- performing the cutting procedure at the cutting station (10) for separating, from a portion of plastic film (3) unrolled by the feed roll (2),
either
a strip (4) of plastic film (3) having a width, measured parallel to the unwinding axis (A), and a length, measured perpendicular to the unwinding axis (A), wherein the width of said strip (4) is larger than the length of the same strip (4);
or
a plurality of distinct film sheets (5) obtained from a same strip shaped portion (400) of plastic film (3), said strip shaped portion (400) having a width, measured parallel to the unwinding axis (A), and a length, measured perpendicular to the unwinding axis (A), wherein the width of said strip shaped portion (400) is larger than the length of the same strip shaped portion (400).

In a 62nd aspect according to the preceding aspect, the process comprises thermoforming said strip (4) or said plurality of distinct film sheets (5) by means of the plurality of moulds (21) of the thermoforming station (20), to define a plurality of plastic supports (6).

In a 63rd aspect according to the preceding aspects 61 or 62, the process comprises packaging at least one product (P) positioned on at least one between said strips (4), distinct film sheets (5) or plastic supports (6).

In a 64th aspect according to any of the preceding aspects from 61 to 63, the cutting procedure, performed by the cutting station (10), comprises making, on the unrolled portion, at least one cut or notch parallel to the unwinding axis (A) of the feed roll (2) to obtain a strip (4), said cut or notch extending along the entire width of the unrolled portion of plastic film (3) to define said strip (4).

In a 65th aspect according to any of the preceding aspects from 61 to 64, the cutting procedure performed by the cutting station (10) comprises making, on the unrolled portion, at least:
- one cut or notch parallel to the unwinding axis (A) of the feed roll (2), said cut or notch extending along the entire width of the unrolled portion of plastic film (3) to define said strip (4).

In a 66th aspect according to the preceding aspect, the cutting procedure performed by the cutting station (10) comprises making, on said strip (4), one or more cuts or notches perpendicular to the unwinding axis (A) of the feed roll (2) to form the plurality of film sheets (5).

In a 67rd aspect according to any of the preceding aspects from 61 to 66, the first conveying line (41) is configured to move each one of the plurality of film sheets (5) from the cutting station (10) to the respective moulds (21) in the thermoforming station (20).

In a 68th aspect according to any of the preceding aspects from 61 to 67, the cutting procedure performed by the cutting station (10) comprises making, on the unrolled portion, at least:
- one or more cuts or notches perpendicular to the unwinding axis (A) of the feed roll (2) to form the plurality of ribbons (3a),
- on said plurality of ribbons, one or more cuts or notches parallel to the unwinding axis (A) of the feed roll (2), said cuts or notches extending along the entire width of the unrolled portion of plastic film (3) to define said plurality of film sheets (5).

In a 69th aspect according to any of the preceding aspects from 61 to 68, the step of unrolling consecutive portions of plastic film (3) comprises advancing plastic film (3) by a length equal to the length of the strips (4) or of the strip shaped portion (400).

In a 70th aspect according to any of the preceding aspects from 61 to 69, the process comprises a step of moving the strips (4) or the plurality of distinct film sheets (5) from the cutting station (10) to the thermoforming station (20) along the first conveying line (41) arranged between the cutting station (10) and the thermoforming station (30).

In a 71st aspect according to any of the preceding aspects from 61 to 70, the process comprises a step of moving, according to the machine direction (MD), the plastic supports (6) from the thermoforming station (20) to the packaging station (30) along the second conveying line (42) arranged between the thermoforming station (20) and the packaging station (30).

In a 72nd aspect according to any of the preceding aspects from 61 to 71, the process comprises the step of extracting the plastic supports (6) from each of the moulds (21) of the thermoforming station (20).

In a 73rd aspect according to any of the preceding aspects from 61 to 72, the process comprises the step of placing at least one product on the plastic support (6).

In a 74th aspect according to any of the preceding aspects from 61 to 73, the process comprises the step of moving said supports (6) towards the packaging station (30) by the second conveying line (42).

In a 75th aspect according to any of the preceding aspects from 63 to 74, the packaging procedure comprises providing a continuous web of plastic film (9) unrolled by the feed roll (8) or distinct plastic film sheets (9a) by the additional supplying station (110).

In a 76th aspect according to the preceding aspect, the packaging procedure comprises engaging, optionally sealing, the plastic supports (6) or the strips (4) or the distinct film sheets (5) with said continuous web of plastic film (9) or distinct plastic film sheets (9a) provided by the additional supplying station (110), in order to form a sealed package (80).

In a 77th aspect according to the preceding aspects 75 or 76, the step of engaging is next to the step of placing the at least one product on the plastic support (6).

In a 78th aspect according to any of the preceding aspects from 63 to 77, the packaging procedure comprises a step of sucking gas from the package (80) in order to define a vacuum sealed package (80).

In a 79th aspect according to any of the preceding aspects from 63 to 78, the packaging procedure comprises a step of insufflating gas into the package (80) in order to define a modified atmosphere sealed package (80).

A 80th aspect refers to an apparatus (100) for manufacturing plastic supports (6) and/or packages (80), the apparatus comprising:
- a supplying station (1) comprising a roll support (1a) configured to receive a feed roll (2) and to rotate the feed roll (2) around a respective unwinding axis (A) to unroll consecutive portions of plastic film (3);
- a cutting station (10) configured for carrying out a cutting procedure comprising separating, from an unrolled portion of plastic film (3) coming from the feed roll (2), at least one between a strip (4) and a plurality of distinct film sheets (5) of plastic film (3);
- a thermoforming station (20) comprising a plurality of adjacent moulds (21) configured for receiving the strips (4) or the plurality of distinct film sheets (5), and thermoforming said strips (4) or said plurality of distinct film sheets (5) in order to form a plurality of plastic supports (6),
- wherein the plurality of moulds (21) are sequentially arranged to form a line of moulds positioned along a thermoforming direction (TD) which is oriented parallel to the unwinding axis (A) of the feed roll (2).

In a 81st aspect according to the preceding aspect, the strip (4), defined by the cutting procedure at the cutting station (10), has a width, measured parallel to the unwinding axis (A), and a length, measured perpendicular to the unwinding axis (A), wherein the width of said strip (4) is larger than the length of the same strip (4), optionally the width of said strip (4) being at least twice than the length of the same strip (4), optionally the strip (4) and/or the plurality of distinct film sheets (5) presenting a rectangular shape.

In a 82nd aspect according to the preceding aspects 80 or 81, the distinct film sheets (5) of plastic film (3) are obtained from a same strip shaped portion (400) of plastic film (3), said strip shaped portion (400) having a width, measured parallel to the unwinding axis (A), and a length, measured perpendicular to the unwinding axis (A), wherein the width of said strip shaped portion (400) is larger than the length of the same strip shaped portion (400), optionally the width of said strip shaped portion (400) is at least twice than the length of said strip shaped portion (400).

In a 83rd aspect according to any of the preceding aspects from 80 to 82, the apparatus (100) comprises the feed roll (2) mounted on the roll support (1a), optionally in an initial condition the feed roll (2) having at least 500 meters of rolled plastic film, optionally between 500 and 2400 meters of rolled plastic film (3).

In an aspect 83A according to the preceding aspect, the feed roll (2) has a radius of at least 300 mm, optionally a radius between 300 and 500 mm.

In an aspect 83B according to the preceding aspects 83 and 83A, the feed roll (2) has a width, measured parallel to the unwinding axis (A), of at least 600 mm, optionally has a width measured parallel to the unwinding axis (A) between 600 and 1200 mm.

In an aspect 83C according to the preceding aspect, said fed roll width is larger, optionally at least 1.5 times, than the radius of the feed roll (2).

In a 84th aspect according to any of the preceding aspects from 80 to 83C, the plastic film (3) of the feed roll (2) of the supplying station (1) has a thickness comprised between 200 and 800 μm.

In a 85th aspect according to any of the preceding aspects from 80 to 84, the cutting procedure, which the cutting station (10) is configured to execute, is designed such that:
- the width of the strips (4) of plastic film (3) is sized to completely cover the longitudinal extension, in the thermoforming direction (TD), of said line of moulds (21); and/or
- the length of the strips (4) of plastic film (3) is sized to completely cover the lateral extension, perpendicularly to the thermoforming direction (TD), of said line of moulds (21).

In a 86th aspect according to any of the preceding aspects from 80 to 85, the apparatus (100) comprises at least one packaging station (30) configured for closing in a package (80) at least one product (P) positioned on the plastic support (6).

In a 87th aspect according to the preceding aspect, the packaging station (30) is arranged downstream with respect to the thermoforming station (20) along a machine direction (MD) of transportation of the plastic supports (6) to the packaging station (30), optionally the unwinding axis (A) of the feed roll (2) being parallel to said machine direction (MD).

In a 88th aspect according to any of the preceding aspects from 80 to 87, the apparatus (100) comprises at least one conveyor (40) configured to move the strips (4) or the plurality of distinct film sheets (5) from the cutting station (10) to the thermoforming station (20),
- optionally the conveyor (40) being configured to move the plastic supports (6) from the thermoforming station (20) to the packaging station (30).

In a 89th aspect according to the preceding aspect, the conveyor (40) presents a first conveying line (41), arranged between the cutting station (10) and the thermoforming station (30), configured to move the strips (4) or the plurality of distinct film sheets (5) from the cutting station (10) to the thermoforming station (20), said first conveying line (41) optionally comprising a vacuum plate (44) presenting a plurality of openings fluidly communicating with a vacuum source configured to define, at least in an apparatus working condition, a pressure at a face of the vacuum plate (44) lower than the atmosphere pressure.

In a 90th aspect according to the preceding aspect, the vacuum plate (44) is configured to engage the strip (4) or the plurality of film sheets (5) and to move it or them from the cutting station (10) to the thermoforming station (20).

In a 91st aspect according to any of the preceding aspects from 88 to 89, the conveyor (40) presents a second conveying line (42), arranged between the thermoforming station (20) and the packaging station (30), configured to move the plastic support (6) from the thermoforming station (20) to the packaging station (30).

In a 92nd aspect according to the preceding aspect, the second conveying line (42) is configured to move the plastic supports (6) parallel to the machine direction (MD).

In a 93rd aspect according to any of the preceding aspects from 80 to 92, the cutting procedure, performed by the cutting station (10), comprises making, on the unrolled portion, at least one cut or notch parallel to the unwinding axis (A) of the feed roll (2), optionally said cut or notch extending along the entire width of the unrolled portion of plastic film (3) to define said strip (4).

In a 94th aspect according to the preceding aspect, the first conveying line (41) is configured to move the strip (4) from the cutting station (10) to the thermoforming station (20).

In a 95th aspect according to any of the preceding aspects from 80 to 94, the cutting procedure performed by the cutting station (10) comprises making, on the unrolled portion, at least one cut or notch parallel to the unwinding axis (A) of the feed roll (2), optionally said cut or notch extending along the entire width of the unrolled portion of plastic film (3) to define said strip (4), and making on said strip (4), one or more cuts or notches perpendicular to the unwinding axis (A) of the feed roll (2) to form the plurality of film sheets (5).

In a 96th aspect according to the preceding aspect, the first conveying line (41) is configured to move each one of the plurality of film sheets (5) from the cutting station (10) to the respective moulds (21) in the thermoforming station (20).

In a 97th aspect according to any of the preceding aspects from 80 to 96, the cutting procedure performed by the cutting station (10) comprises making, on the unrolled portion, at least one or more cuts or notches perpendicular to the unwinding axis (A) of the feed roll (2) to form the plurality ribbons (3a), and making, on said plurality of ribbons (3a), one or more cuts or notches parallel to the unwinding axis (A) of the feed roll (2), optionally said cuts or notches extending along the entire width of the unrolled portion of plastic film (3) to define said plurality of film sheets (5).

In a 98th aspect according to the preceding aspect, the first conveying line (41) is configured to move each film sheet (5) of the plurality of film sheets (5) from the cutting station (10) to the respective mould (21) in the thermoforming station (20).

In a 99th aspect according to any of the preceding aspects from 80 to 98, each mould (21) of the plurality of moulds (21) is configured to thermoform at least one between the strip (4) and the distinct film sheets (5) to make respective plastic supports (6), the plastic supports (6) being in the form of trays presenting an inner concavity configured for receiving at least one product (P).

In a 100th aspect according to any of the preceding aspects from 80 to 99, the moulds (21) comprise at least a heating source configured to allow plastic deformation of the strips (4) or of the plurality of distinct film sheets (5) to obtain said supports (6).

In a 101st aspect according to any of the preceding aspects from 80 to 100, the plurality of moulds of the thermoforming station (20) presents a length, measured perpendicularly to the thermoforming direction (TD), said length being equal to or lower than:
  the length of the strips (4) of plastic film (3); or
  the length of the plurality of distinct film sheets (5).

In a 102nd aspect according to any of the preceding aspects from 80 to 101, the thermoforming station (20) comprises at least an upper and a lower tool (22, 23), movable one respect to the other between an open position, wherein the upper and the lower tools (22, 23) are distanced and the moulds (21) are configured to receive the strip (4) or the plurality of distinct film sheets (5); and a closed position, wherein the upper and the lower tools (22, 23) are approached, optionally in contact, defining an inner volume to allow for thermoforming the plastic film (3).

In a 103rd aspect according to any of the preceding aspects from 80 to 102, the strip (4) or the plurality of film sheets (5) obtained by the plastic film (3) are intended to define bottom portions of the package (80).

In a 104th aspect according to any of the preceding aspects from 80 to 103, the apparatus comprises an additional supplying station (110) arranged between the thermoforming station (20) and the packaging station (30), said additional supplying station (110) being configured to provide consecutive portions of top plastic film (9) to the packaging station (30) to package the at least one product (P).

In a 105th aspect according to the preceding aspect, the additional supplying station (110) comprises a feed roll (8) configured to rotate around a respective unwinding axis (B) to unroll consecutive portions of plastic film (9) in the form of a continuous web, said continuous web being configured to engage with the plastic supports (6) or with the plurality of film sheets (5) or with strips (4) to define a sealed package (80) containing the at least one product (P), optionally the plastic film (9) of the additional supplying station (110) having a thickness lower than the one of the plastic film (3) provided by the supplying station (1).

In a 106th aspect according to aspects 104, the additional supplying station (110) is configured to provide consecutive portions of plastic film (9) in the form of distinct film sheets (9a), said distinct film sheets (9a) being configured to engage with the plastic supports (6) or with the plurality of film sheets (5) or with strips (4) to define a sealed package (80) containing the at least one product (P).

In a 107th aspect according to any of the preceding aspects from 104 to 106, the plastic film (9) of the additional supplying station (110) has a thickness lower than the one of the plastic film (3) provided by the supplying station (1), optionally the plastic film (9) of the additional supplying station (110) having a thickness comprised between 10 and 200 µm.

In a 108th aspect according to any of the preceding aspects from 80 to 107, the apparatus (100) comprises a sensor (90) associated to the feed roll (2) of the supplying station (1), said sensor (90) being configured for emitting a representative signal of at least one between:
  an angular rotation of the feed roll (2);
  an angular speed of the feed roll (2);
  an advancement of the plastic film (3) exiting the feed roll (2);
  a speed of the plastic film (3) exiting the feed roll (2);

an acceleration of the plastic film (3) exiting the feed roll (2);

a length of plastic film (3) unrolled portions.

In a 109th aspect according to the preceding aspect, the sensor (90) associated to the feed roll (2) of the supplying station (1) comprises at least one between an encoder, an optical sensor, a potentiometer, and a variable electric resistance.

In a 110th aspect according to any of the preceding aspects from 80 to 109, the thermoforming station (20) comprises at least one position sensor (92) configured for emitting at least a representative signal of the upper or lower tools (22, 23) position or relative position thereof.

In a 111th aspect according to any of the preceding aspects from 80 to 110, the apparatus comprises a conveyor sensor (95) associated to the conveyor (40), said sensor (95) being configured for emitting at least a representative signal of at least one between a position, a speed and an acceleration of the conveyor, optionally said sensor (95) being configured for emitting at least a representative signal of at least one between a position, a speed and an acceleration of the plastic supports (6), the strips (4) or of the film sheets (5).

In a 112th aspect according to any of the preceding aspects from 80 to 111, the apparatus (100) comprises at least one control unit (70).

In an aspect 112A according the preceding aspect, control unit (70) is connected to one or more, preferably all, said sensors, and active on at least one between the supplying station (1), the cutting station (10), the thermoforming station (20) and n the conveyor (40).

In a 113th aspect according to the preceding aspects 112 or 112A, the control unit (70) is configured for commanding the advancement of the plastic film by controlling the supplying station (1) and in particular rotation of the motor (7) of the supplying station (1) and synchronizing the cutting procedure according to the plastic film (3) advancement.

In a 114th aspect according to aspects 112, 112A or 113, the control unit (70) is configured for receiving the representative signal emitted by the sensor (90) of the feed roll (2), said signal representing the advancement of the plastic film (3) exiting the feed roll (2).

In a 115th aspect according to any of the preceding aspects from 112 to 114, the control unit (70) is configured for commanding advancements of the plastic film (3) from the supplying station (1) towards the cutting station (10) by controlling in rotation the motor (7) of the supplying station (1).

In a 116th aspect according to any of the preceding aspects from 112 to 115, the control unit (70) is configured for evaluating the advancement of the unrolled portion of plastic film (3) based on said representative signal, wherein each predetermined advancement is substantially equal to the length of the strip (4).

In a 117th aspect according to any of the preceding aspects from 112 to 116, the control unit (70) is configured for, once achieved a predetermined advancement of the plastic film (3), stopping the advancement of the plastic film (3) by controlling in rotation the motor (7) of the supplying station (1) and commanding the cutting procedure to be executed by the cutting station (10).

In a 118th aspect according to the preceding aspect, the length of the strip (4) is equal to said predetermined advancement.

In a 119th aspect according to any of the preceding aspects from 80 to 118, at least in a configuration wherein the cutting procedure comprises first making, on the unrolled portion, at least one or more cuts or notches perpendicular to the unwinding axis (A) of the feed roll (2) to form a plurality of ribbons (3a), and then making, on said plurality of ribbons (3a), one or more cuts or notches parallel to the unwinding axis (A) of the feed roll (2), said cuts or notches extending along the entire width of the unrolled portion of plastic film (3) to define said plurality of film sheets (5), the cutting station (10) comprises a guide (15) configured to offset said ribbons (3a) such that adjacent ribbons or ribbon portions are arranged on different paths.

In an 120th aspect according to any of the preceding aspects from 80 to 119, the cutting station (10) comprises a guide (15) configured to vertically and/or horizontally offset the ribbons (3a) such that adjacent ribbons are arranged on different and non-parallel lying paths. In the example of FIG. 1 the guide is configured to vertically offset portions of adjacent the ribbons (3a) such that adjacent ribbons take different trajectories at least for a portion of their path thereby facilitating separation.

In a 121st aspect according to the previous aspect, the guide (15) comprises a plurality of adjacent guide rollers (15a) extending parallel to the unwinding axis (A), each guide roller (15a) being active on a respective of said ribbons and being vertically and/or horizontally shifted with respect to an adjacent guide roller (15a). In the non-limiting example of FIG. 1, the plurality of guide rollers are positioned each one at a vertical height different from the height of the next adjacent roller, with the first and third roller being the same height and the second and fourth roller being at the same height.

A 122nd aspect refers to a process of manufacturing plastic packages (80) optionally using the apparatus (100) of any of the preceding aspects, comprising the step of unrolling consecutive portions of plastic film (3) by rotating the feed roll (2) around the respective unwinding axis (A), optionally the step of unrolling consecutive portions of plastic film (3) comprising advancing plastic film (3) by a length equal to the length of the strips (4) or of the strip shaped portion (400).

In a 123rd aspect according to the preceding aspect, the process comprises the step of performing the cutting procedure at the cutting station (10) for separating, from a portion of plastic film (3) unrolled by the feed roll (2), either a strip (4) of plastic film (3) having a width, measured parallel to the unwinding axis (A), and a length, measured perpendicular to the unwinding axis (A), wherein the width of said strip (4) is larger than the length of the same strip (4);

or a plurality of distinct film sheets (5) obtained from a same strip shaped portion (400) of plastic film (3), said strip shaped portion (400) having a width, measured parallel to the unwinding axis (A), and a length, measured perpendicular to the unwinding axis (A), wherein the width of said strip shaped portion (400) is larger than the length of the same strip shaped portion (400).

In a 124th aspect according to aspects 122 or 123, the process comprises a step of thermoforming said strip (4) or said plurality of distinct film sheets (5) by means of the plurality of moulds (21) of the thermoforming station (20), to define a plurality of plastic supports (6).

In a 125th aspect according to aspects 122, 123 or 124, the process comprises a step of packaging at least one product (P) positioned on at least one between said strips (4), distinct film sheets (5) or plastic supports (6).

In a 126th aspect according to any of the preceding aspects from 122 to 125, the cutting procedure, performed by the cutting station (10), comprises making, on the unrolled portion, at least one cut or notch parallel to the unwinding axis (A) of the feed roll (2) to obtain a strip (4), optionally said cut or notch extending along the entire width of the unrolled portion of plastic film (3) to define said strip (4).

In a 127th aspect according to any of the preceding aspects from 122 to 126, the cutting procedure performed by the cutting station (10) comprises making, on the unrolled portion, at least:
- one cut or notch parallel to the unwinding axis (A) of the feed roll (2), said cut or notch extending along the entire width of the unrolled portion of plastic film (3) to define said strip (4),
- on said strip (4), one or more cuts or notches perpendicular to the unwinding axis (A) of the feed roll (2) to form the plurality of film sheets (5), the first conveying line (41) being configured to move each one of the plurality of film sheets (5) from the cutting station (10) to the respective moulds (21) in the thermoforming station (20).

In a 128th aspect according to any of the preceding aspects from 122 to 127, the cutting procedure performed by the cutting station (10) comprises making, on the unrolled portion, at least:
- one or more cuts or notches perpendicular to the unwinding axis (A) of the feed roll (2) to form the plurality ribbons (3a),
- on said plurality of ribbons, one or more cuts or notches parallel to the unwinding axis (A) of the feed roll (2), said cuts or notches extending along the entire width of the unrolled portion of plastic film (3) to define said plurality of film sheets (5).

In a 129th aspect according to any of the preceding aspects from 122 to 128, the process comprises moving the strips (4) or the plurality of distinct film sheets (5) from the cutting station (10) to the thermoforming station (20) along the first conveying line (41) arranged between the cutting station (10) and the thermoforming station (30).

In a 130th aspect according to any of the preceding aspects from 122 to 129, the process comprises extracting the plastic supports (6) from each of the moulds (21) of the thermoforming station (20).

In a 131st aspect according to any of the preceding aspects from 122 to 130, the process comprises moving, according to the machine direction (MD), the plastic supports (6) from the thermoforming station (20) to the packaging station (30) along the second conveying line (42) arranged between the thermoforming station (20) and the packaging station (30).

In a 132nd aspect according to any of the preceding aspects from 122 to 131, the process comprises placing at least one product on the plastic support (6).

In a 133rd aspect according to any of the preceding aspects from 122 to 132, the process comprises providing a continuous web of plastic film (9) unrolled by the feed roll (8) or distinct plastic film sheets (9a) by the additional supplying station (110).

In a 134th aspect according to any of the preceding aspects from 122 to 133, the process comprises engaging, optionally sealing, the plastic supports (6) or the strips (4) or the distinct film sheets (5) with said continuous web of plastic film (9) or distinct plastic film sheets (9a) provided by the additional supplying station (110), in order to form a sealed package (80).

In a 135th aspect according to any of the preceding aspects from 122 to 134, the process comprises the step of engaging being next to the step of placing the at least one product on the plastic support (6), optionally wherein the packaging procedure comprises a step of sucking gas from the package (80) in order to define a vacuum sealed package (80) and/or wherein the packaging procedure comprises a step of insufflating gas into the package (80) in order to define a modified atmosphere sealed package (80).

In a 136th aspect according to any of the preceding aspects, the conveyor (40) comprises at least one motor (47), optionally an electric motor (47), configured to set in motion the conveyor (40), optionally the motor (47) being configured to set in motion a belt of said conveyor (40).

In a 137th aspect according to any of the preceding aspects, the second conveying line (42) comprises at least one motor (47), optionally an electric motor (47), configured to set in motion a belt of said second conveying line (42).

In a 138th aspect according to any of the preceding aspects, the cutting station (10) comprises at least one between a blade tool, rotating blade tool, a laser cutting tool, a punching or notching tool, configured for separating the plastic strip (4) or the plurality of distinct film sheets (5) from an unrolled portion of plastic film (3).

In a 139th aspect according to any of the preceding aspects, the thermoforming station (20) comprises at least one motor (27), optionally an electric motor (27), configured to reciprocally move at least one between the upper the lower tools (22, 23) between the open and the closed position of the thermoforming station (20).

In a 140th aspect according to any of the preceding aspects, the packaging station (30) comprises at least one upper and one lower tool (32, 33), movable one respect to the other between an open position, wherein the upper and the lower tools (32, 33) are distanced; and a closed position, wherein the upper and the lower tools (32, 33) are approached, optionally in contact, defining an inner close volume.

In a 141st aspect according to any of the preceding aspects from 39 to 139, the packaging station (30) is configured for receiving the plastic film (9) unrolled by the feed roll (8) of the additional supplying station (110) or the distinct plastic film sheets (9a) by the additional supplying station (110), and packaging the product (P), at least during said close position, by engaging said plastic film (9) or distinct plastic film sheets (9a) provided by the additional supplying station (110) with at least one between the strips (4), the plurality of film sheets (5) and the plastic supports (6) made of plastic film (3) unrolled by the feed roll (2) of the supplying station (1), optionally the packaging procedure defining a sealed package (80).

In a 142nd aspect according to any of the preceding aspects from 39 to 141, the packaging station (30) comprises a welding head (36) configured to engage the plastic film (9) or the distinct plastic film sheets (9a) of the additional supplying station (110) with at least one between the strip (4), the plurality of film sheets (5) and the plastic supports (6) of plastic film (3) unrolled by the feed roll (2) of the supplying station (1).

In a 143rd aspect according to any of the preceding aspects from 4 to 142, the packaging station (30) comprises a vacuum device (34) configured to suck gas from the package (80), locally defining a pressure lower than the atmosphere pressure.

In a 144th aspect according to any of the preceding aspects from 4 to 143, the packaging station (30) comprises at least one motor (37), optionally an actuator or an electric motor (37), optionally configured to reciprocally move at least one between the upper the lower tool (32, 33) of the packaging station (30) between the open and the closed position.

In a 145th aspect according to any of the preceding aspects from 2 to 144, the plastic strip (4) has a width between 500 and 1200 mm.

In a 146th aspect according to any of the preceding aspects from 2 to 145, the plastic strip (4) has a length between 140 and 300 mm.

In a 147th aspect according to any of the preceding aspects, the supplying station (1) comprises at least one driving roll (101) connected to a motor (7) of the supplying station (1), said motor (7) being configured to put in rotation said driving roll (101), the driving roll (101) being arranged substantially parallel to the unwinding axis (A) of the feed roll (2) and configured to contact, at least in an operative condition of the apparatus (100) and when the feed roll (2) is mounted on the roll supports (1a), to the feed roll (2).

In a 148th aspect according to the preceding aspect, the at least one driving roll (101) presents a lateral surface which is configured to contact with a lateral surface of the feed roll (2).

In a 149th aspect according to the preceding aspects 147 and 148, the at least one driving roll (101) is configured to put in rotation the feed roll (2) to unwind consecutive portions of plastic film (3).

In a 150th aspect according to aspects 147, 148 or 149, the at least one driving roll (101) is movable towards and away from the feed roll (2), optionally towards and away from the unwinding axis (A) of the feed roll (2), to compensate the reduction of the feed roll (2) diameter during unwinding of the plastic film (3).

BRIEF DESCRIPTION OF THE DRAWINGS

Some embodiments and some aspects of the invention will be described hereinafter with reference to the accompanying drawings, provided for indicative and therefore not limiting purposes, in which:

FIGS. 5 and 7 are schematic views of an apparatus according to the present invention coupled with a production line;

CONVENTIONS

Figure 1:
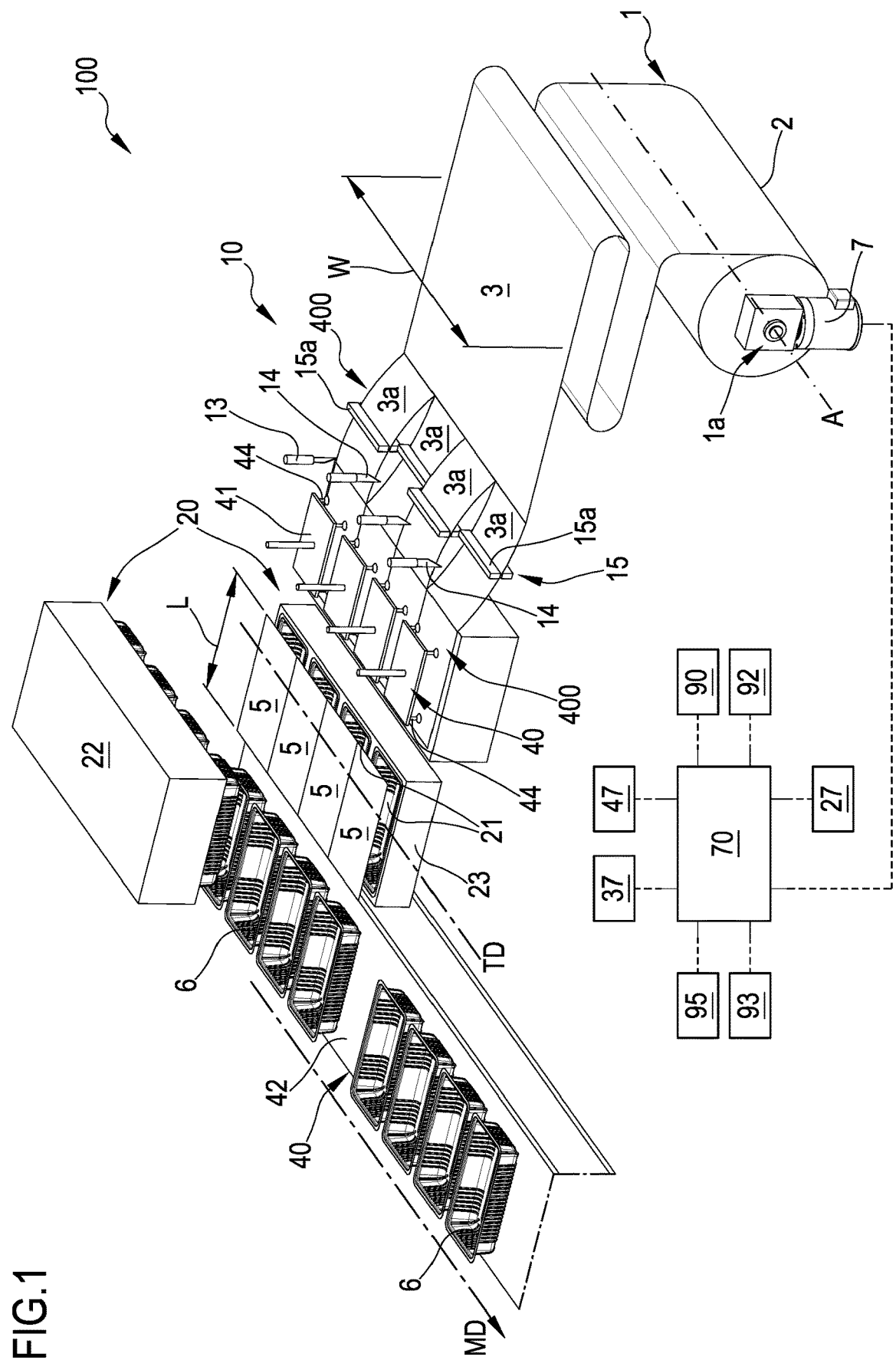
FIGS. 1 and 3 are schematic views of an apparatus according to the present invention.

It should be noted that in the present detailed description, corresponding parts illustrated in the various figures are indicated with the same reference numerals. The figures could illustrate the object of the invention by means of non-scale representations; therefore, parts and components shown in the figures relating to the object of the invention could only concern schematic representations.

The terms upstream and downstream refer to a direction of advancement of a package—or of a support for making said package—along a predetermined path defined starting from a starting or forming station of a support for said package, through a packaging station and then up to a packaging unloading station.

Definitions

Although certain aspects of the invention may find application for packaging a product into a packaging solely formed of one or more plastic films, the following description will mainly refer to packaging of a product positioned on a support to which a plastic film is heat sealed. Note the product may be a food product or not.

As used herein support means either a substantially flat element onto which a product is placed, or a container of the type having a base wall, a side wall and a top rim radially emerging from the side wall, the container defining a volume into which the product is positioned.

The tray or supports may have a rectangular shape or any other suitable shape, such as round, square, elliptical etcetera, and may be formed either while the packaging process takes place, e.g. at a thermoforming station of the packaging apparatus, or they may be manufactured beforehand and then fed to the packaging apparatus.

The Trays or Supports

The tray or support may be made of a single layer or, preferably, of a multi-layer polymeric material. In case of a single layer material suitable polymers are for instance polystyrene, polypropylene, polyesters, high density polyethylene, poly(lactic acid), PVC and the like, either foamed or solid.

Preferably the tray or support is provided with gas barrier properties. As used herein such term refers to a film or sheet of material which has an oxygen transmission rate of less than 200 cm3/m2-day-bar, less than 150 cm3/m2-day-bar, less than 100 cm3/m2-day-bar as measured according to ASTM D-3985 at 23° C. and 0% relative humidity.

Suitable materials for gas barrier monolayer thermoplastic trays are for instance polyesters, polyamides and the like.

In case the tray or support is made of a multi-layer material, suitable polymers are for instance ethylene homo- and co-polymers, propylene homo- and co-polymers, polyamides, polystyrene, polyesters, poly(lactic acid), PVC and the like. Part of the multi-layer material can be solid and part can be foamed.

For example, the tray or support may comprises at least one layer of a foamed polymeric material chosen from the group consisting of polystyrene, polypropylene, polyesters and the like.

The multi-layer material may be produced either by co-extrusion of all the layers using co-extrusion techniques or by glue- or heat-lamination of, for instance, a rigid foamed or solid substrate with a thin film, usually called "liner".

The thin film may be laminated either on the side of the tray or support in contact with the product P or on the side facing away from the product P or on both sides. In the latter case the films laminated on the two sides of the tray may be the same or different. A layer of an oxygen barrier material, for instance (ethylene-co-vinyl alcohol) copolymer, is optionally present to increase the shelf-life of the packaged product P.

Gas barrier polymers that may be employed for the gas barrier layer are PVDC, EVOH, polyamides, polyesters and blends thereof. The thickness of the gas barrier layer will be set in order to provide the tray with an oxygen transmission rate suitable for the specific packaged product.

The tray or support may also comprise a heat sealable layer. Generally, the heat-sealable layer will be selected among the polyolefins, such as ethylene homo- or co-polymers, propylene homo- or co-polymers, ethylene/vinyl acetate copolymers, ionomers, and the homo- and co-polyesters, e.g. PETG, a glycol-modified polyethylene terephthalate.

Additional layers, such as adhesive layers, to better adhere the gas-barrier layer to the adjacent layers, may be present in the gas barrier material for the tray and are preferably present depending in particular on the specific resins used for the gas barrier layer.

In case of a multilayer material used to form the tray or support, part of this structure may be foamed and part may be un-foamed. For instance, the tray may comprise (from the outermost layer to the innermost food-contact layer) one or more structural layers, typically of a material such as foam polystyrene, foam polyester or foam polypropylene, or a cast sheet of e.g. polypropylene, polystyrene, poly(vinyl chloride), polyester or cardboard; a gas barrier layer and a heat-sealable layer.

The tray or supports may be obtained from a sheet of foamed polymeric material having a film comprising at least one oxygen barrier layer and at least one surface sealing layer laminated onto the side facing the packaged product, so that the surface sealing layer of the film is the food contact layer the tray. A second film, either barrier or non-barrier, may be laminated on the outer surface of the tray or support.

Specific formulations are used for food products which require heating in conventional or microwave oven before consumption. The surface of the container in contact with the product, i.e. the surface involved in the formation of the seal with the lidding film, comprises a polyester resin. For instance the container can be made of a cardboard coated with a polyester or it can be integrally made of a polyester resin. Examples of suitable containers for the package of the invention are CPET, APET or APET/CPET containers. Such container can be either foamed or not-foamed.

The Film or Film Material Applied to Trays or Supports to form a Package

Film or film material is applied to the tray to form a lid onto the tray (e.g. for MAP-modified atmosphere packaging) or a skin associated to the tray or support and matching the contour of the product.

The film for skin applications may be made of a flexible multi-layer material comprising at least a first outer heat-sealable layer, an optional gas barrier layer and a second outer heat-resistant layer. The outer heat-sealable layer may comprise a polymer capable of welding to the inner surface of the supports carrying the products to be packaged, such as for instance ethylene homo- or co-polymers, like LDPE, ethylene/alpha-olefin copolymers, ethylene/acrylic acid copolymers, ethylene/methacrylic acid copolymers, and ethylene/vinyl acetate copolymers, ionomers, co-polyesters, e.g. PETG. The optional gas barrier layer preferably comprises oxygen impermeable resins like PVDC, EVOH, polyamides and blends of EVOH and polyamides. The outer heat-resistant layer may be made of ethylene homo- or copolymers, ethylene/cyclic-olefin copolymers, such as ethylene/norbornene copolymers, propylene homo- or co-polymers, ionomers, (co)polyesters, (co)polyamides. The film may also comprise other layers such as adhesive layers or bulk layers to increase thickness of the film and improve its abuse and deep drawn properties. Particularly used bulk layers are ionomers, ethylene/vinyl acetate copolymers, polyamides and polyesters. In all the film layers, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents and the like additives known to those skilled in the art of packaging films.

One or more layers of the film can be cross-linked to improve the strength of the film and/or its heat resistance. Cross-linking may be achieved by using chemical additives or by subjecting the film layers to an energetic radiation treatment. The films for skin packaging are typically manufactured in order to show low shrink when heated during the packaging cycle. Those films usually shrink less than 15% at 160° C., more frequently lower than 10%, even more frequently lower than 8% in both the longitudinal and transversal direction (ASTM D2732). The films usually have a thickness comprised between 20 microns and 200 microns, more frequently between 40 and 180 microns and even more frequently between 50 microns and 150 microns.

The skin packages are usually "easy-to-open", i.e. they are easily openable by manually pulling apart the two webs, normally starting from a point like a corner of the package where the upper web has purposely not been sealed to the support. To achieve this feature, either the film or the tray can be provided with a suitable composition, allowing easy opening of the package, as known in the art. Typically, the sealant composition and/or the composition of the adjacent layer of the tray and/or the film are adjusted in order to achieve the easy opening feature.

Various mechanisms can occur while opening an easy-to-open package.

In the first one ("peelable easy opening") the package is opened by separating the film and the tray at the seal interface.

In the second mechanism ("adhesive failure") the opening of the package is achieved through an initial breakage through the thickness of one of the sealing layers followed by delamination of this layer from the underlying support or film.

The third system is based on the "cohesive failure" mechanism: the easy opening feature is achieved by internal rupture of a seal layer that, during opening of the package, breaks along a plane parallel to the layer itself.

Specific blends are known in the art to obtain such opening mechanisms, ensure the peeling of the film from the tray surface, such as those described in EP1084186.

On the other hand, in case the film 18 is used for creating a lid on the tray, the film material may be obtained by co-extrusion or lamination processes. Lid films may have a symmetrical or asymmetrical structure and can be mono-layer or multilayer.

The multilayer films have at least 2, more frequently at least 5, even more frequently at least 7 layers. The total thickness of the film may vary frequently from 3 to 100 micron, in particular from 5 to 50 micron, even more frequently from 10 to 30 micron.

The films may be optionally cross-linked. Cross-linking may be carried out by irradiation with high energy electrons at a suitable dosage level as known in the art. The lid films described above may be heat shrinkable or heat-set. The heat shrinkable films typically show free shrink value at 120° C. measured according to ASTM D2732 in the range of from 2 to 80%, more frequently from 5 to 60%, even more frequently from 10 to 40% in both the longitudinal and transverse direction. The heat-set films usually have free shrink values lower than 10% at 120° C., preferably lower than 5% in both the longitudinal and transversal direction (ASTM D 2732). Lid films usually comprise at least a heat sealable layer and an outer skin layer, which is generally made up of heat resistant polymers or polyolefin. The sealing layer typically comprises a heat-sealable polyolefin which in turn comprises a single polyolefin or a blend of two or more polyolefins such as polyethylene or polypropylene or a blend thereof. The sealing layer can be further provided with antifog properties by incorporating one or more antifog additives into its composition or by coating or spraying one or more antifog additives onto the surface of the sealing layer by technical means well known in the art. The sealing layer may further comprise one or more plasticisers. The skin layer may comprises polyesters, polyamides or polyolefin. In some structures, a blend of polyamide and polyester can advantageously be used for the skin layer. In some cases, the lid films comprise a barrier layer. Barrier films typically have an OTR (evaluated at 23° C. and 0% R.H. according to ASTM D-3985) below 100 cm3/(m2·day·atm) and more frequently below 80 cm3/(m2·day·atm). The barrier layer is usually made of a thermoplastic resin selected among a saponified or hydrolyzed product of ethylene-vinyl acetate copolymer (EVOH), an amorphous polyamide and a vinyl-vinylidene chloride and their admixtures. Some materials comprise an EVOH barrier layer, sandwiched between two polyamide layers. The skin layer typically comprises polyesters, polyamides or polyolefin.

In some packaging applications, the lid films do not comprise any barrier layer. Such films usually comprise one or more polyolefin are herein defined.

Non-barrier films typically have an OTR (evaluated at 23° C. and 0% R.H. according to ASTM D-3985) from 100 cm3/(m2·day·atm) up to 10000 cm3/(m2·day·atm), more typically up to 6000 cm3/(m2·day·atm).

Peculiar compositions polyester-based are those used for tray lidding of ready-meals packages. For these films, the polyester resins can make up at least 50%, 60%, 70%, 80%, 90% by weight of the film. These films are typically used in combination with polyester-based supports.

For instance the container can be made of a cardboard coated with a polyester or it can be integrally made of a polyester resin. Examples of suitable containers for the package are CPET, APET or APET/CPET containers, either foamed or not-foamed.

Usually, biaxially oriented PET are used as the lid film due to its high thermal stability at standard food heating/cooking temperatures. Often biaxially oriented polyester films are heat-set, i.e. non-heat-shrinkable. To improve the heat-sealability of the PET lidding film to the container a heat-sealable layer of a lower melting material is usually provided on the film. The heat-sealable layer may be coextruded with the PET base layer (as disclosed in EP-A-1,529, 797 and WO2007/093495) or it may be solvent- or extrusion-coated over the base film (as disclosed in U.S. Pat. No. 2,762,720 and EP-A-1,252,008).

Particularly in the case of fresh red meat packages, twin lidding film comprising an inner, oxygen-permeable, and an outer, oxygen-impermeable, lidding film are advantageously used. The combination of these two films significantly prevents the meat discoloration also when the packaged meat extends upwardly with respect to the height of the tray walls, which is the most critical situation in barrier packaging of fresh meat.

These films are described for example in EP1848635 and EP0690012, the disclosures of which are herein incorporated by reference.

The lid film can be monolayer. Typical composition of monolayer films comprise polyesters as herein defined and their blends or polyolefins as herein defined and their blends.

In all the film layers herein described, the polymer components may contain appropriate amounts of additives normally included in such compositions. Some of these additives are preferably included in the outer layers or in one of the outer layers, while some others are preferably added to inner layers. These additives include slip and anti-block agents such as talc, waxes, silica, and the like, antioxidants, stabilizers, plasticizers, fillers, pigments and dyes, cross-linking inhibitors, cross-linking enhancers, UV absorbers, odor absorbers, oxygen scavengers, bactericides, antistatic agents, anti-fog agents or compositions, and the like additives known to those skilled in the art of packaging films.

The films suitable for lidding application can advantageously be perforated, in order to allow the packaged food to breath.

Those films may be perforated by using different technologies available in the art, through laser or mechanical means such as rolls provided with several needles.

The number of perforations per unit area of the film and their dimensions affect the gas permeability of the film.

Microperforated films are usually characterized by OTR value (evaluated at 23° C. and 0% R.H. according to ASTM D-3985) from 2500 cm3/(m2·day·atm) up to 1000000 cm3/(m2·day·atm).

Macroperforated films are usually characterized by OTR (evaluated at 23° C. and 0% R.H. according to ASTM D-3985) higher than 1000000 cm3/(m2·day·atm).

Furthermore, the films herein described for lidding applications can be formulated to provide strong or peelable sealing onto the support. A method of measuring the force of a peelable seal, herein referred to as "peel force" is described in ASTM F-88-00. Acceptable peel force values fare in the range from 100 g/25 mm to 850 g/25 mm, from 150 g/25 mm to 800 g/25 mm, from 200 g/25 mm to 700 g/25 mm.

The desired seal strength is achieved specifically designing the tray and the lid formulations.

In general, one or more layers of the lid film can be printed, in order to provide useful information to the consumer, a pleasing image and/or trademark or other advertising information to enhance the retail sale of the packaged product.

The film may be printed by any suitable method, such as rotary screen, gravure or flexographic techniques mas known in the art.

Definitions and Conventions Concerning Materials

PVDC is any vinylidene chloride copolymers wherein a major amount of the copolymer comprises vinylidene chloride and a minor amount of the copolymer comprises one or more unsaturated monomers copolymerisable therewith, typically vinyl chloride, and alkyl acrylates or methacrylates (e.g. methyl acrylate or methacrylate) and the blends thereof in different proportions. Generally a PVDC barrier layer will contain plasticisers and/or stabilizers as known in the art.

As used herein, the term EVOH includes saponified or hydrolyzed ethylene-vinyl acetate copolymers, and refers to ethylene/vinyl alcohol copolymers having an ethylene comonomer content preferably comprised from about 28 to about 48 mole %, more preferably, from about 32 to about 44 mole % ethylene, and even more preferably, and a saponification degree of at least 85%, preferably at least 90%.

The term "polyamides" as used herein is intended to refer to both homo- and co- or ter-polyamides. This term specifically includes aliphatic polyamides or co-polyamides, e.g., polyamide 6, polyamide 11, polyamide 12, polyamide 66, polyamide 69, polyamide 610, polyamide 612, copolyamide 6/9, copolyamide 6/10, copolyamide 6/12, copolyamide 6/66, copolyamide 6/69, aromatic and partially aromatic polyamides or co-polyamides, such as polyamide 6I, polyamide 6I/6T, polyamide MXD6, polyamide MXD6/MXDI, and blends thereof.

As used herein, the term "copolymer" refers to a polymer derived from two or more types of monomers, and includes terpolymers. Ethylene homopolymers include high density polyethylene (HDPE) and low density polyethylene (LDPE). Ethylene copolymers include ethylene/alpha-olefin copolymers and ethylene/unsaturated ester copolymers. Ethylene/alpha-olefin copolymers generally include copolymers of ethylene and one or more comonomers selected from alpha-olefins having from 3 to 20 carbon atoms, such as 1-butene, 1-pentene, 1-hexene, 1-octene, 4-methyl-1-pentene and the like.

Ethylene/alpha-olefin copolymers generally have a density in the range of from about 0.86 to about 0.94 g/cm$^3$. The term linear low density polyethylene (LLDPE) is generally understood to include that group of ethylene/alpha-olefin copolymers which fall into the density range of about 0.915 to about 0.94 g/cm$^3$ and particularly about 0.915 to about 0.925 g/cm$^3$. Sometimes linear polyethylene in the density range from about 0.926 to about 0.94 g/cm$^3$ is referred to as linear medium density polyethylene (LMDPE). Lower density ethylene/alpha-olefin copolymers may be referred to as very low density polyethylene (VLDPE) and ultra-low density polyethylene (ULDPE). Ethylene/alpha-olefin copolymers may be obtained by either heterogeneous or homogeneous polymerization processes.

Another useful ethylene copolymer is an ethylene/unsaturated ester copolymer, which is the copolymer of ethylene and one or more unsaturated ester monomers. Useful unsaturated esters include vinyl esters of aliphatic carboxylic acids, where the esters have from 4 to 12 carbon atoms, such as vinyl acetate, and alkyl esters of acrylic or methacrylic acid, where the esters have from 4 to 12 carbon atoms.

Ionomers are copolymers of an ethylene and an unsaturated monocarboxylic acid having the carboxylic acid neutralized by a metal ion, such as zinc or, preferably, sodium.

Useful propylene copolymers include propylene/ethylene copolymers, which are copolymers of propylene and ethylene having a majority weight percent content of propylene, and propylene/ethylene/butene terpolymers, which are copolymers of propylene, ethylene and 1-butene.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like.

Specific examples include polyethylene homo-polymer, polypropylene homo-polymer, polybutene homo-polymer, ethylene-alpha-olefin co-polymer, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the (C3-Ci9)alkanedioic acids are particularly suitable, in particular succinic acid, sebacic acid, adipic acid, azelaic acid, suberic acid or pimelic acid. Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous copolyesters include co-polyesters of terephthalic acid with an aliphatic diol and a cycloaliphatic diol, especially ethylene glycol and 1,4-cyclohexanedimethanol.

Product

The term product P refers to an article or a composite of articles of any kind. For example, the product may be of a foodstuff type and be in the solid, liquid or gel state, i.e. in the form of two or more of the aforementioned aggregation states.

In the food sector, the product can include: meat, fish, cheese, treated meats, prepared and frozen meals of various kinds.

Control Unit

The packaging apparatus described and claimed herein may include one or more control units, designed to control the operations performed by the apparatus. The control unit can evidently be only one or be formed by a plurality of distinct control units according to the design choices and operational needs.

The term control unit means an electronic component which can comprise at least one of: a digital processor (for example comprising at least one selected in the group between: CPU, GPU, GPGPU), a memory (or memories), an analog circuit, or a combination of one or more digital processing units with one or more analog circuits. The control unit can be "configured" or "programmed" to perform some steps: this can be done in practice by any means that allows you to configure or program the control unit. For example, in the case of a control unit comprising one or more CPUs and one or more memories, one or more programs can be stored in appropriate memory banks connected to the CPU or to the CPUs; the program or programs contain instructions which, when executed by the CPU or the CPUs, program or configure the control unit to perform the operations described in relation to the control unit. Alternatively, if the control unit is or includes analog circuitry, then the control unit circuit may be designed to include configured circuitry in use to process electrical signals so as to perform the steps related to control unit. The control unit may comprise one or more digital units, for example of the microprocessor type, or one or more analog units, or a suitable combination of digital and analog units; the control unit can be configured to coordinate all the actions necessary for executing an instruction and instruction sets.

Actuator

The term actuator means any device capable of causing movement on a body, for example behind the control unit (reception by the actuator of a command sent by the control unit). The actuator can be of an electric, pneumatic, mechanical (for example with a spring) type, or of another type.

DETAILED DESCRIPTION

The following description refers to an apparatus 100 for manufacturing plastic supports and/or packages (80) according but not limited to the different embodiments shown in the attached drawings; the description also discloses a process of manufacturing plastic supports and/or packages, in particular of the type using the apparatus (100). The packages are configured to carry at least one product, i.e. a food-type product.

Apparatus 100—First Embodiment

Figure 2:
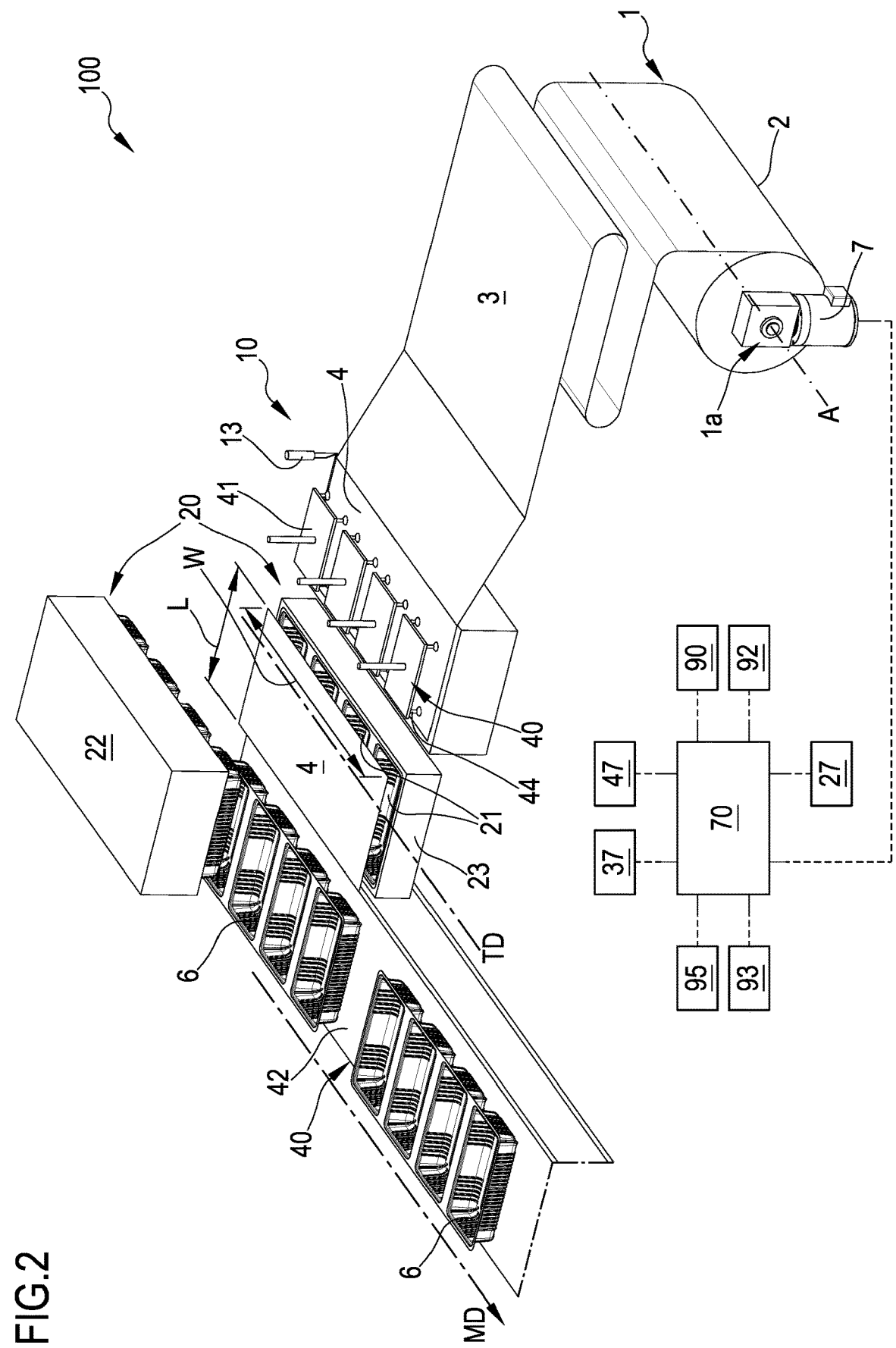
FIGS. 2 and 4 are schematic views of an apparatus according to a different embodiment of the present invention.
Figure 4:
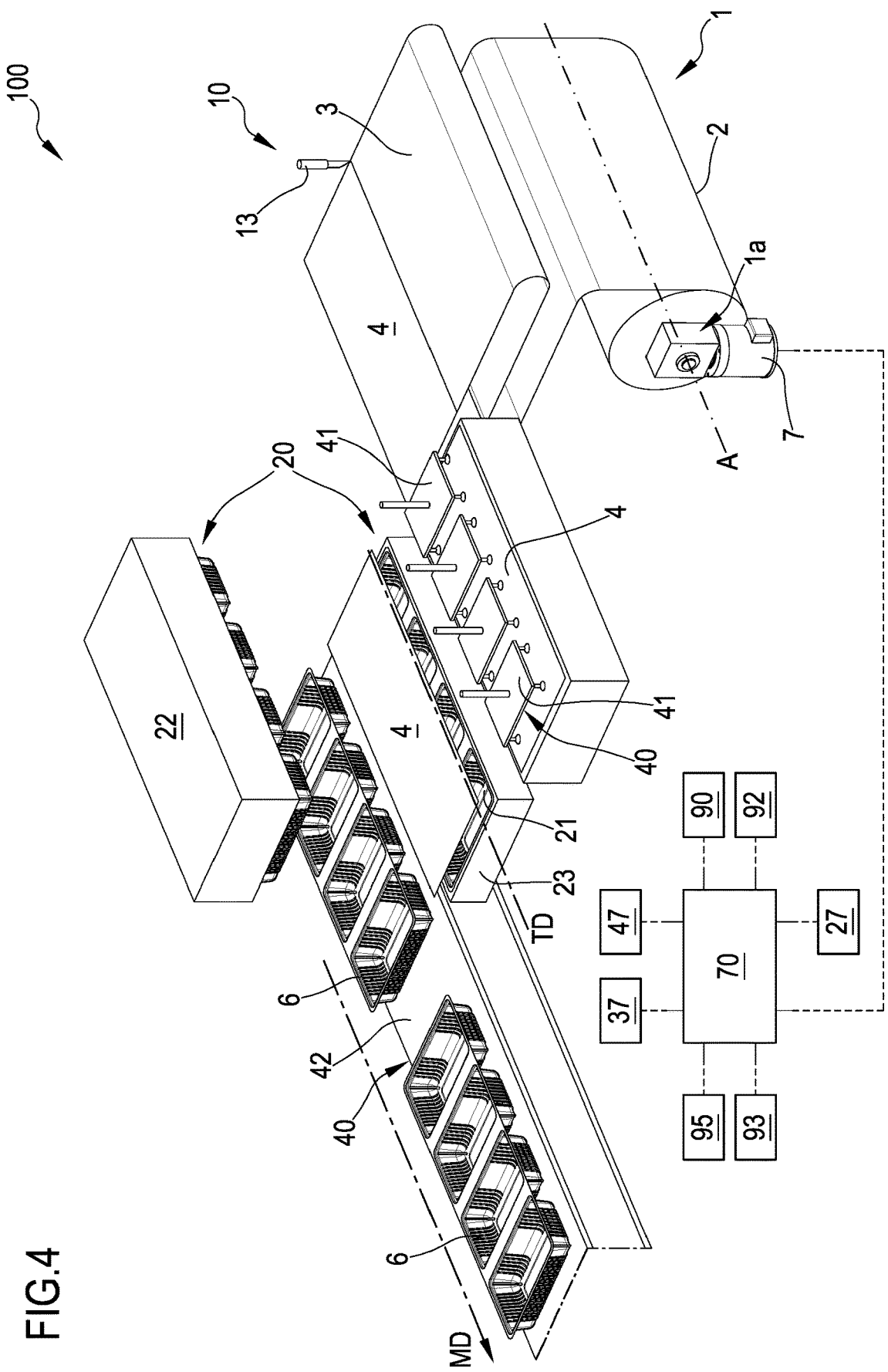
Figure 6:
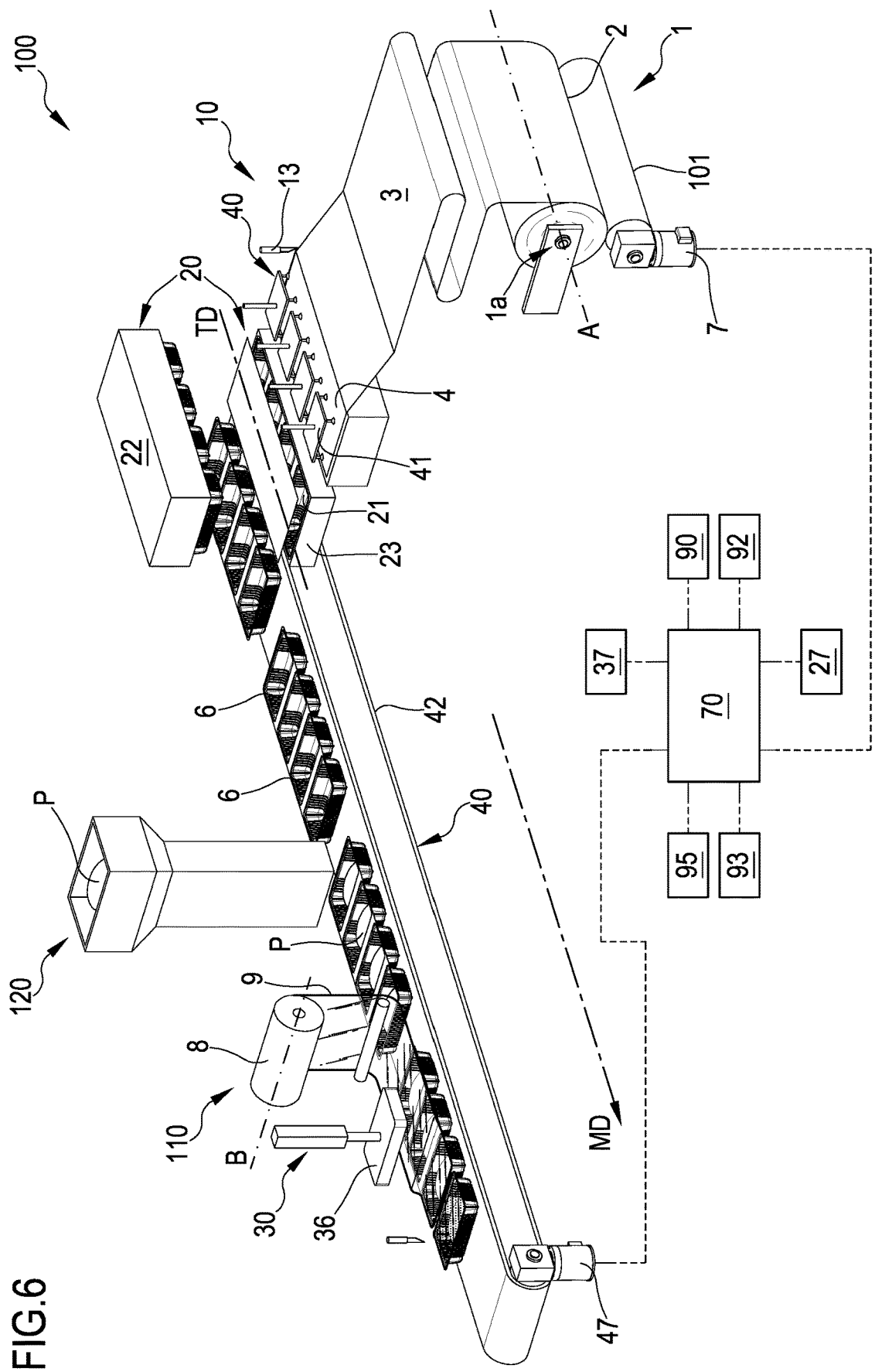
FIG. 6 is a schematic view of an apparatus according to a different embodiment of the present invention coupled with a production line.

According to a first embodiment shown in FIGS. 2, 4 and 6, the apparatus 100 comprises a supplying station 1 presenting a feed roll 2 configured to turn around a respective unwinding axis A to unroll consecutive portions of plastic film 3. The axis A, according to a preferred configuration, is arranged horizontally, in particular parallel to the ground. The feed roll 2 comprises several layers of a single plastic film 3 rolled around the axis A of the feed roll, such as in an initial condition the feed roll 2 comprises at least 600 meters of rolled plastic film 3, in particular between 600 and 2400 meters of rolled plastic film 3. In the initial condition, the feed roll 2 has a width, measured parallel to the unwinding axis A, larger than the radius of the feed roll 2. According to a preferred configuration, in the initial condition, the feed roll 2 presents a width, measured parallel to the unwinding axis A, which is at least 1.5 times than the radius of the feed roll 2. The feed roll, in the initial condition, presents a diameter comprised between 600 mm and 1000 mm, and a width comprised between 600 mm and 1200 mm. The plastic film 3 unrolled by the feed roll 2 has a thickness comprised between 200 µm and 800 µm. The width of the feed roll 2 is equal to the width, measured parallel to the unwinding axis A, of the plastic film 3 portions sequentially unrolled by the feed roll 2: in other words, the feed roll 2 comprises a long plastic film ribbon rolled around the axis A defining the feed roll 2, wherein the width of the ribbon is equal to the width of the feed roll 2.

The supplying station 1 may have an electric motor 7 connected to the feed roll 2 and configured to put into rotation the feed roll 2 around the unwinding axis A, in order to unroll, in a controlled manner, subsequent portions of plastic film 3. The electric motor 7 may be connected to the feed roll 2 through a gear train, in order to reduce the angular speed of the motor and increase the applied torque.

The apparatus 100 may also comprise a displacement sensor 90 associated to the feed roll 2 of the supplying station 1, and configured for emitting a signal representative of at least one between:
  an angular rotation of the feed roll 2,
  an angular speed of the feed roll 2,
  speed or acceleration of the plastic film 3 exiting the feed roll 2,
  a displacement of the unrolled portion of plastic film 3,
  a length of the unrolled portion of plastic film 3.

In other words, displacement sensor 90 is configured to measure either the rotation of the feed roll 2 and send an appropriate representative signal to a control unit 70, which is then configured to retrieve the length of plastic film 3 unrolled by the feed roll 2 based on said representative signal; alternatively, displacement sensor 90 may directly measure the length of the plastic film 3 unrolled portion or detect presence at a pre-determined location of the leading edge of the unrolled portion and, again, provide a representative signal to the control unit 70, which the control until may use to calculate the length of plastic film unrolled from the feed roll; the information provided by displacement sensor 90 may be used in combination with other signals coming from subsequent working stations as it will be explained later in description. The displacement sensor 90 associated to the feed roll 2 of the supplying station 1 may in practice comprise at least one between an encoder, an optical sensor, a potentiometer, a variable electric resistance or any other suitable transducer connected with the control unit 70.

The apparatus 100 also comprises a cutting station 10, shown if FIGS. 2 and 4, configured for carrying out a cutting procedure over the unrolled portions of plastic film 3 subsequently provided by the supplying station 1 to the cutting station 10. The cutting procedure comprises separating, from the unrolled portion 2 of plastic film 3 coming from the feed roll 2, a strip 4 of plastic film 3 presenting a flat rectangular shape. The strip 4 presents a width W and a length L, respectively measured parallel and perpendicular to the unwinding axis A, wherein the width W of the strip 4 is larger than the length L thereof. In a preferred configuration, the width W of the strip 4 is at least twice than the length L thereof, as shown in FIGS. 2, 4 and 6: for example, the strip 4 presents a width comprised between 600 mm and 1200 mm, and a length comprised between 140 mm and 300 mm. The strip 4 may also have a non-rectangular shape as long as the width remains larger than the length thereof as described above.

Moreover, the strips 4 have a thickness equal to the thickness of the plastic film 3 and are intended to define bottom portions (such as flat supports or trays), configured for receiving a product P, of the plastic package 80, as explained herein below.

The cutting procedure, performed by the cutting station 10, comprises making, on the unrolled portion, at least one cut or notch parallel to the unwinding axis A of the feed roll 2. The cut or notch extends along the entire width of the unrolled portion of plastic film 3 to define the strip 4. In order to perform the cut or notch, the cutting station 10 may comprise a blade tool, a rotating blade tool, a laser cutting tool, a punching or notching tool, configured for separating the plastic strip 4 from the unrolled portions of plastic film 3. FIGS. 2, 4 and 6 show a schematic representation of the cutting station 10: the separation performed by the cutting station 10 may actually be performed according to several different cutting techniques configured to obtain the above-mentioned strip 4.

The cutting station 10 may comprise an actuator, optionally an electric actuator, associated to one or more cutting tools and configured to implement the cutting procedure: in particular the actuator is configured to move a cutting tool over the plastic film 3 in order to separate the strip 4 by the unrolled portion of plastic film 3. The operation of the cutting station 10 and of the supplying station may be coordinated and synchronized by the control unit 70: for example the control unit 70 may be configured to cause a step-by-step advancement of the unrolled portion of plastic film 3 to the cutting station and synchronize operation of the cutting station with operation of the supplying station such that the cutting procedure takes place when at least the part of unrolled portion of plastic film 3 that needs to be cut to form strip 4 is not in motion.

According to a preferred configuration, the apparatus 100 also comprises a thermoforming station 20, configured for receiving and thermoforming the plastic strip 4 to form a plurality of plastic supports 6. The thermoforming station 20 may present a plurality of adjacent moulds 21 configured to thermoform plastic supports 6. The moulds are sequentially arranged to form a line of moulds positioned along a thermoforming direction TD, wherein the thermoforming direction TD is parallel to the axis A of the feed roll: FIGS. 2, 4 and 6 show four moulds aligned along the TD direction. The possibility of providing more than one line of moulds is not excluded: for example, the thermoforming station 20 may have two lines of juxtaposed moulds, both lines extending along the thermoforming direction TD parallel to the axis A of the feed roll 2.

Figure 3:
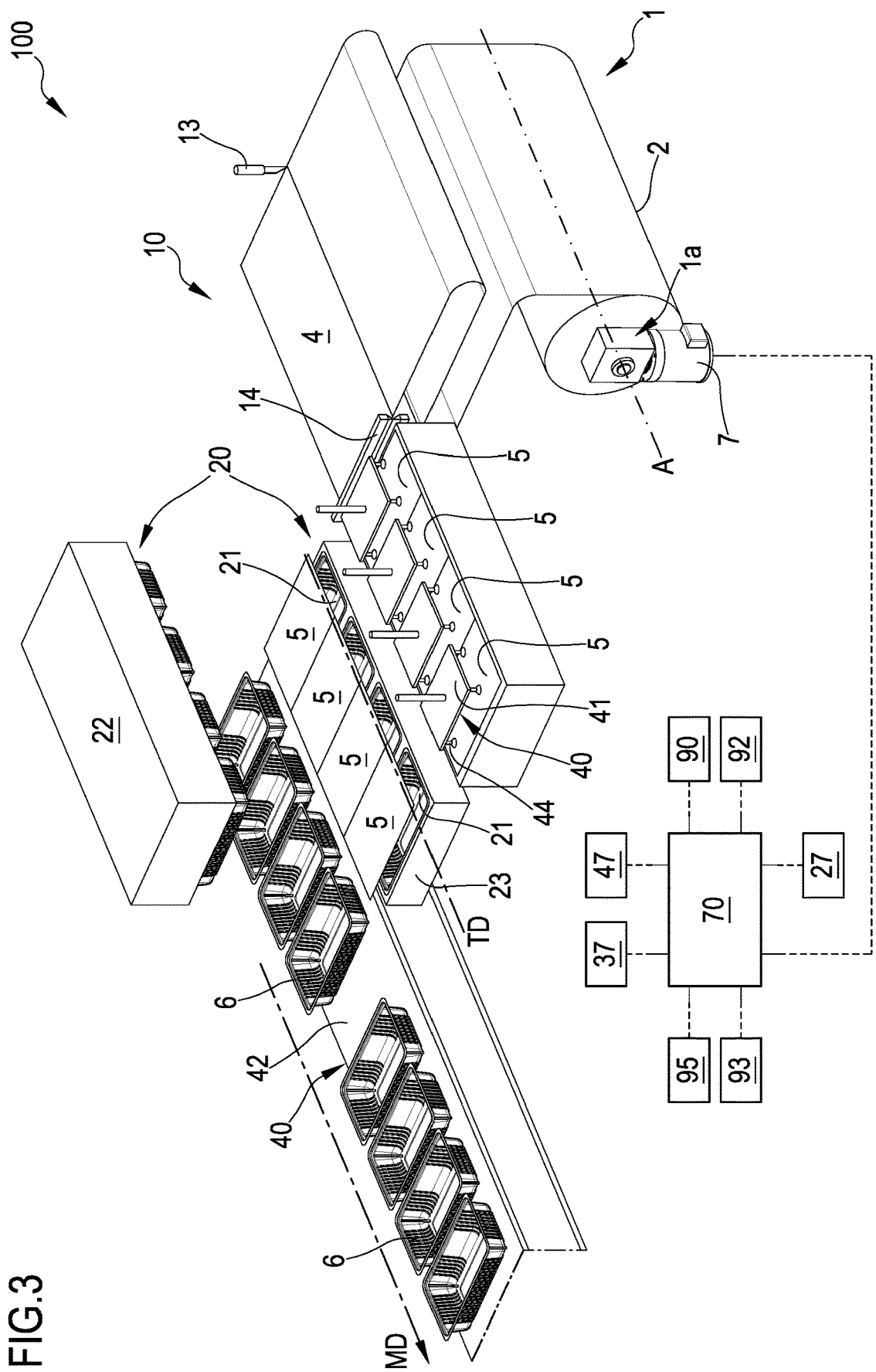

FIG. 2 shows a configuration of the apparatus 100 according to the first embodiment, wherein the feed roll 2 extends with axis parallel to the thermoforming station 20 and wherein the feed roll is positioned such as to face and be aligned with the mould of the thermoforming station 20; FIGS. 3 and 4 show an alternative configuration of the apparatus 100 according to the first embodiment wherein the feed roll 2 has axis parallel to the thermoforming station 20 but the position of the feed roll is shifted in a direction parallel to the thermoforming direction TD whereby the feed roll 2 is no longer aligned with the moulds of the thermoforming station by rather laterally shifted (in FIGS. 3 and 4 on the right of the cutting station 10).

The thermoforming station 20 comprises at least an upper and a lower tool 22, 23, movable one respect to the other between an open position and a closed position. During the open position, the upper and the lower tools 22, 23 are distanced and the moulds 21 are configured to receive the strips 4 coming from the cutting station 10. On the other side, during the close position, the upper and the lower tools 22, 23 are approached or in contact, defining an inner volume for housing and thermoforming the plastic film 3. At least when the upper and lower tools are in the close position, a heating source is configured to increase the temperature of the moulds 21, to allow plastic deformation of the strip 4, which may be and take the shape of the moulds using appropriate suction devices (which attract the film against the wall of the moulds) and/or mechanical system where a male tool portion cooperates with a female tool portion to form the film as desired. In the FIGS. 1 to 4 it is shown how at the moulding station 20 each film strip 4 may be formed into 4 connected tray-shaped elements obtaining the plastic supports 6.

The thermoforming station 20 may comprise an electric motor or other actuator 27, configured to reciprocally move the upper and the lower tools 22, 23 between the open position and the closed position of the thermoforming station 20.

The cutting procedure performed by the cutting station 10 is designed such that the width of the strips 4 of plastic film 3 is sized to completely cover the longitudinal extension, in the thermoforming direction TD, of the line of moulds 21. In other words, the thermoforming station 20 presents a width, measured parallel to the thermoforming direction TD, equal to or lower than the width W of the strips 4 of plastic film 3. Similarly, the cutting procedure performed by the cutting station 10 is designed such that the length L of the strips 4 of plastic film 3 is sized to completely cover the lateral extension, perpendicularly to the thermoforming direction TD, of the line of moulds 21. The strip 4, once moved from the cutting station 10 to the thermoforming station 20, extends all over the plurality of moulds 21, as clearly shown in FIG. 2.

According to the first embodiment, the strip 4 is a unique body extending over the plurality of moulds 21: therefore, the plastic supports 6 formed by the thermoforming station 20 are joined together forming an array of plastic supports or trays 6: according to the configuration proposed in FIG. 2, the thermoforming station 20 comprises four moulds 21, defining therefore batches of four moulds joined together. According to an ancillary configuration, the thermoforming station 20 may comprise a cutting tool configured for separating the plastic supports 6 from one another, e.g., when the upper and lower tools of the thermoforming station 20 are in the close position.

Each of the plastic supports 6 shown in FIGS. 2, 4 and 6 comprise a bottom wall and a lateral wall emerging from the bottom wall thereby defining a thermoformed tray configured for receiving one or more products P.

The thermoforming station 20 may comprise a position sensor 92, associated to the upper and/or to the lower tool 22, 23, and configured for emitting at least a representative signal of the upper or lower tools 22, 23 absolute or relative position. In more detail, the position sensor 92 is able to evaluate if the thermoforming station 20 is in an open or close position and emit a corresponding signal which is received by the control unit 70: the control unit is then configured to use this information in combination with information concerning the status of the other stations, i.e. the supplying station 1 and the cutting station 10, in such a way that the sequential working operations are implemented in a synchronized manner by the control unit 70.

The apparatus 100 also comprises a conveyor 40, which includes a first conveying line 41 arranged between the cutting station 10 and the thermoforming station 20. The first conveying line 41 is configured to move the strips 4 from the cutting station 10 to the thermoforming station 20. According to FIGS. 2, 4 and 6, the first conveying line 41 of the conveyor 40 comprises a vacuum plate 44 presenting a plurality of openings fluidly communicating with a vacuum source which is configured to define, at least in an apparatus working condition, a pressure at a face of the vacuum plate 44 lower than the atmosphere pressure. The low pressure defined on the vacuum plate 44 allows the engagement of the strip 4 in order to move the latter from the cutting station 10 to the thermoforming station 20. In particular, the first conveying line 41 moves the strip 4 from the cutting station 10 over the moulds 21 of the thermoforming station 20, at least when the latter is in an open position. The first conveying line 41, may comprise one or more arms connected each other presenting, at an end portion, the vacuum plate 44, and movable from the cutting station 10 to the thermoforming station 20.

Note that conveyor 40 may also be different from the vacuum plate 44 described above: for instance conveyor 40 may include side pincers active on the shorter borders of the strip and coordinated by control unit 70 to transfer the strip from the cutting station 10 to the moulding station 20. Other alternatives may be envisaged without departing from the scope of the inventions.

In another possible alternative, for example, the thermoforming station 20 may comprise a plurality of upper tools provided with suction holes connectable to a vacuum source and sequentially cooperating with the same lower tool, such that while one of the upper tools is used to pick the strip 4 from the cutting station, another upper tool may cooperate with the lower tool and form the trays or supports. Irrespective of its design, the conveyor 40 is controlled by the control unit 70 and its operation synchronized with that of the supplying station 1, cutting station 10 and moulding station 20.

Downstream with respect to the cutting station 10 and to the thermoforming station 20, the apparatus 100 comprises a filling station 120 configured for receiving the plastic supports 6 coming from the thermoforming station 20, and placing/delivering at least one product on the plastic supports 6. The products can be arranged on the plastic supports 6 manually by operators or by automatic means. The filling station 120 may be equipped with presence sensors configured to evaluate the position of consecutive plastic supports in order to synchronise the delivery of product P with the presence of a respective plastic support 6. FIG. 6 shows a schematic and non-limitative representation of the filling station 120 according to the present embodiment.

The apparatus may also comprise an additional supplying station 110 arranged downstream with respect to the thermoforming station 20, and configured to provide consecutive portions of a top plastic film 9 intended to sequentially engage with the plastic supports 6 coming from the thermoforming station 20, in order to define a sealed package 80 comprising at least one product P. The top plastic film 9 supplied by the additional supplying station 110 preferably presents different features with respect to the plastic film 3 unrolled by the feed roll 2 and used to form the trays/supports 6 (please see in this respect above sections "The trays or supports" and "The film or film material applied to trays or supports to form a package".

Specifically, the plastic film 9 of the additional supplying station 110 generally has a thickness significantly smaller than the one of the plastic film 3 provided by the supplying station 1: in a preferred configuration, the plastic film 9 provided by the additional supplying station 110 presents a thickness comprised between 10 and 200 µm.

In an ancillary configuration, the apparatus 1000 may not comprise any thermoforming station 20 for example if the products are directly positioned on the strip 4 which thus acts as a flat support: in this case, the filling station 120 is configured for receiving the strips 4 by the cutting station 10, and placing/delivering at least one product P on the flat plastic strips 4 coming from the cutting station 10. In this ancillary configuration, the additional supplying station 110 is arranged downstream with respect to the cutting station 10, and configured to provide consecutive portions of plastic film 9 intended to sequentially engage with the strips 4 coming from the cutting station 10, in order to define a sealed package 80 comprising at least one product P.

In a configuration shown in FIG. 6, the additional supplying station 110 presents a feed roll 8 configured to rotate around a respective unwinding axis B to unroll consecutive portions of top plastic film 9 in the form of a continuous web, as schematically shown in FIG. 6. The web is unrolled over the plastic supports 6 or, in case the apparatus does not comprise any thermoforming station 20, over the strips 4, in order to package the product P.

The additional supplying station 110 may comprise a motor (not shown in the attached figures) configured to put in rotation the feed roll 8 in order to allow the top plastic film 9 to be unrolled by the feed roll 8 and to control the plastic film 9 delivery. In an alternative configuration, the additional supplying station 110 provides consecutive portions of plastic film 9 in the form of a plurality of distinct plastic film sheets 9a, wherein each sheet 9a is configured to engage with a respective plastic support 6 or with a strip 4, to define a sealed package 80 containing the at least one product P. Each sheet 9a is displaced over the plastic supports 6 or over the strips 4, in order to package the product P: the displacement may be performed manually or by using a vacuum plate or other transfer device configured for engaging and moving one or more plastic film sheets 9a.

According to a preferred embodiment, the apparatus 100 comprises a packaging station 30, schematically shown in FIG. 6, configured for closing in a package at least one product P positioned on the plastic supports 6 coming from the thermoforming station 20. Therefore, the packaging station 30 is arranged downstream with respect to the thermoforming station 20 along a machine direction MD of transportation of the plastic supports 6 to the packaging station 30: in a possible configuration, the unwinding axis A of the feed roll 2 is parallel to the machine direction MD, as shown in FIG. 6.

When the apparatus 100 does not comprise a thermoforming station 20 the packaging station 30 may be configured for closing at least one product P positioned on the strip 4 (which acts as flat support) coming from the cutting station 10. In this configuration, the packaging station 30 directly receives the flat plastic strips 4 cut by the cutting station 10, without any thermoforming procedure taking place between cutting and packaging station.

The packaging station 30 is also configured for receiving the consecutive portions of the top plastic film 9 in the form of a continuous web or in the form of distinct plastic film sheets 9a from the additional supplying station 110: the packaging station 30 is configured for packaging the product P, by engaging top the plastic film 9 with the strips 4 or with the plastic supports 6 of plastic film 3.

The packaging station 30 may comprise an upper and a lower tool 32, 33, movable one respect to the other between an open position, wherein the upper and the lower tools 32, 33 are spaced apart the one from the other, and a closed position, wherein the upper and the lower tools 32, 33 are approached or in contact, defining an inner close volume. The upper or the lower tools 32, 33 may comprise a welding head 36 configured to engage the continuous web of top plastic film 9 or the distinct plastic film sheets 9a provided by the additional supplying station 110 with the strips 4 or with the plastic supports 6 of plastic film 3. The welding head 36, schematically shown in FIG. 6, comprises a heating source in order to locally melt and weld the plastic film 9 to the strips 4 or plastic supports 6, defining a stable and fluid tight engagement.

The packaging station 30 may also comprise a vacuum device configured to suck gas from the package 80, locally defining a pressure lower than the atmosphere pressure. In more detail, the vacuum device of the packaging station 30 is configured to remove gas (i.e., air) present between the plastic support 6 and the plastic film 9 of the additional supplying station 110, or in between the strip 4 and the plastic film 9 of the additional supplying station 110, in order to make a vacuum skin package. The vacuum device may include a hollow needle configured to perforate the plastic support defining holes configured to allow the air to be efficiently removed from inside the plastic support 6.

The packaging station 30 may also comprise an electric motor or actuator 37, controlled by control unit 70, and configured to reciprocally move the upper and the lower tool 32, 33 of the packaging station 30 between the open and the closed position, therefore allowing the plastic supports 6 or the strip 4 to enter the packaging station 30. The packaging station 30 may also comprise a sensor 93 configured for emitting a representative signal whether the upper and the lower tools 32, 33 are in a close or open condition and communicatively linked to the control unit which may be configured to control the packaging station and in particular the motor or actuator 37 based on the signals coming from the sensor 93.

Figure 5:
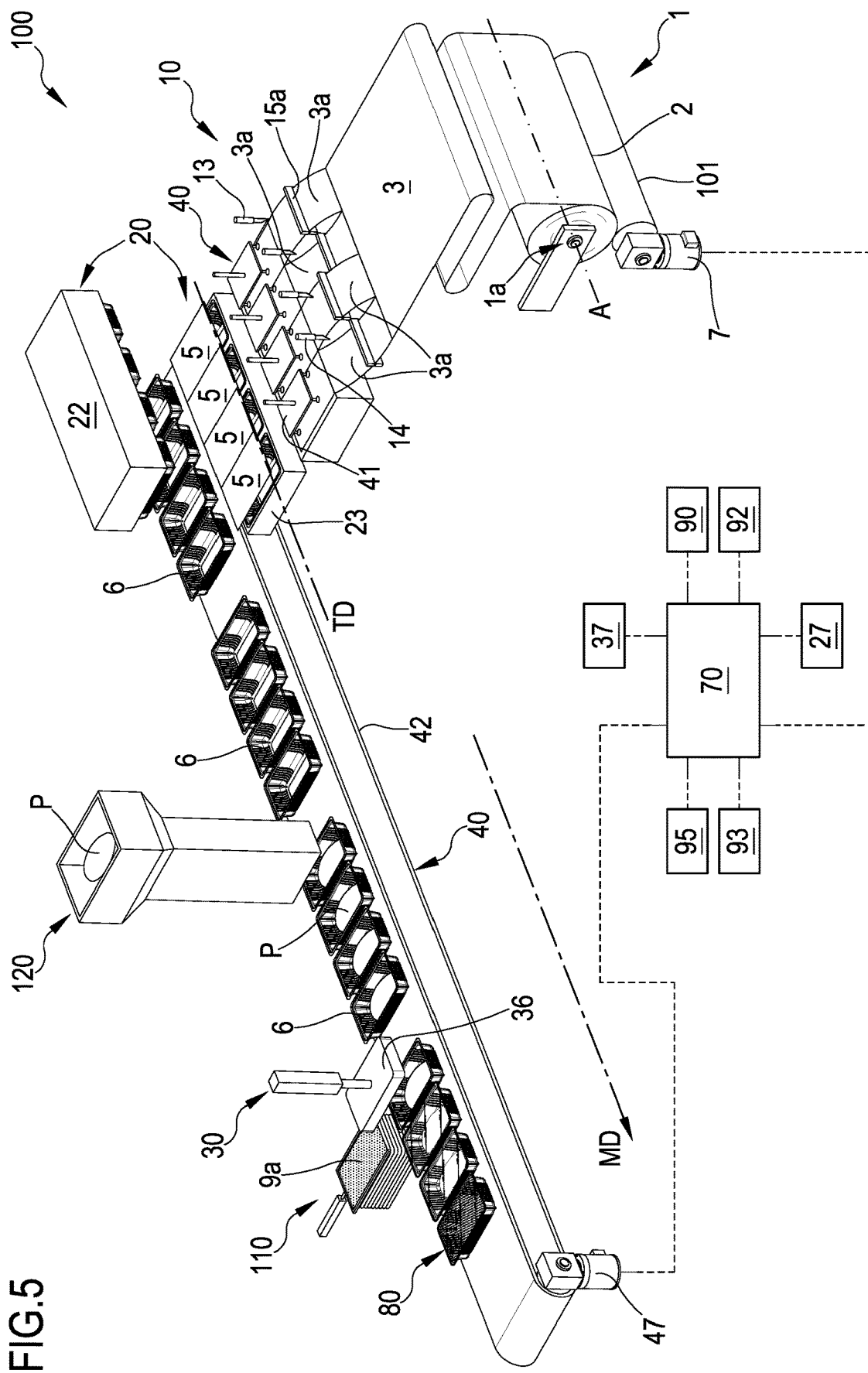

In the embodiments shown in FIGS. 5-7, the conveyor 40 comprises a second conveying line 42 arranged between the thermoforming station 20 and the packaging station 30 as shown in FIG. 6, and configured to move the plastic support 6 from the thermoforming station 20 to the packaging station 30, optionally passing through the filling station 120 and the additional supplying station 110. In a preferred configuration, the second conveying line 42 is configured to move the plastic supports 6 parallel to the machine direction MD. According to FIG. 6, the second conveying line 42 comprises a belt stretching between a first and a second roller configured to guide the belt, defining a conveyor belt on which the plastic supports 6 exiting the thermoforming station 20 positioned. Note the exit from the thermoforming station may be achieved manually or with the aid of a gripper engaging the supports 6 and moving them from the moulds to the second conveying line 42.

If the apparatus 100, in an ancillary configuration, has no thermoforming station 20 then the second conveying line 42 is configured to move the strips 4 from the cutting station 10 to the packaging station 30, passing through the filling station 120 and the additional supplying station 110.

The conveyor 40 comprises an electric motor 47 configured to set in motion the second conveying line 42: in particular, the motor 47 is connected to the first or second roller of the second conveying line 42 in order to put in rotation the rollers and to make the belt advance.

The apparatus may comprise a sensor 95 associated to the conveyor 40, and configured for emitting at least a representative signal of a position, speed or acceleration of the conveyor 40: according to a preferred configuration, the sensor 95 is associated to the second conveying line 42 and is configured to generate a signal relating to a position, a speed or an acceleration of the plastic supports 6 or of the strips 4 arranged on the second conveying line: the signal from sensor 95 is received by control unit 70 which is also communicatively connected to sensor 95. The sensor 95 may comprise an encoder associated to motor 47 or to the conveyor rollers, an optical sensor, a potentiometer, and a variable electric resistance.

As we already mentioned, apparatus 100 comprises a control unit 70, schematically shown in the attached figures, configured to communicate with the plurality of working stations in order to correctly synchronize the sequential operations described above.

In more detail, the control unit 70 is connected with the motor 7 of the feed roll 2 and to the displacement sensor 90 associated to the feed roll 2: the control unit 70 is configured to receive the representative signal from the displacement sensor 90 and command the motor 7 based on said signal.

The control unit 70 is also connected to the cutting station 10, optionally to the actuator of the cutting station 10, and configured to command activation or stop of the cutting procedure performed on the unrolled portions of plastic film 3.

The control unit 70 may also be connected with the motor 27 of the thermoforming station 20 and to the position sensor 92 associated to the upper and the lower tools 22, 23 of the thermoforming station 20: the control unit 70 is thus configured to receive the representative signal from the sensor 92 and command the motor 27 based on said signal to open and close the thermoforming station.

The control unit 70 may also be connected with the motor 37 of the packaging station 30 and to the sensor 93 associated to the upper and the lower tools 32, 33 of the packaging station 30: the control unit 70 is configured to receive the representative signal from the sensor 93 and command the motor 37 based on said signal in order to approach or move apart one from the other the tools 32 and 33 of the packaging station 30.

The control unit 70 may also be connected with the motor 47 of the conveyor 40 and to the position sensor 95 associated to the conveyor 40: the control unit 70 is thus configured to receive the representative signal from the sensor 95 and command the motor 47 based on said signal.

The control unit may be simultaneously connected to all the working stations present in the apparatus 100 receiving the signals by the respective sensors associated to the working stations and commanding the activation or the stop of each operation: in other words, the control unit 70 is configured to synchronize the supplying of plastic film 3 by the feed roll 2 of the supplying station 1 with all the subsequent operations, including the cutting, thermoforming, product filling, packaging and transportation procedure.

Apparatus 100—Second Embodiment

In a second embodiment schematically shown in FIGS. 1, 3, 3A, 5, 5A and 7, the apparatus 100 comprises the supplying station 1 previously described according to the first embodiment: in particular the supplying station 1 comprises the feed roll 2 and the plastic film 3 as previously described. Therefore, all the features related to the supplying station 1 and described according the first embodiment are reflected in the second embodiment of the apparatus 100.

The apparatus 100, according to the second embodiment, also comprises a cutting station 1 configured for carrying out a cutting procedure comprising separating, from an unrolled portion of plastic bottom film 3 coming from the feed roll 2 of the supplying station 1, a plurality of distinct film sheets 5 obtained from a same strip shaped portion 400 of plastic film 3, as shown in FIG. 1. The strip shaped portion 400 presents a width W and a length L, respectively measured parallel and perpendicular to the unwinding axis A of the feed roll 2, wherein the width W is larger than the length L. The strip shaped portion 400 has a width equal to the width of the portion of plastic film 3 unrolled by the feed roll 2. More in detail, the strip shaped portion 400 has a width equal to the width of the feed roll 2. According to a preferred configuration, the width W of the strip shaped portion 400 is at least twice than the length L thereof. The distinct film sheets 5 have a thickness equal to the thickness of the plastic film 3 unrolled by the feed roll 2.

In other words, the second embodiment of the apparatus 100 differs from the first embodiment for the fact that the cutting station 10 is configured to make a plurality of distinct film sheets 5 instead of a single strip 4: therefore, the operating stations following the cutting station 100 are configured to receive the distinct film sheets 5 instead of a single film strip 4.

The cutting station 10 comprises a first blade or cutter, here identified as first blade tool 13, and a second blade or cutter, herein identified as second blade tool 14, as shown in FIG. 1: the first blade tool may be a single blade extending parallel to roll axis A and covering the entire width of the plastic film 3 or a small blade movable parallel to axis A or other tool capable of forming a through cut or a notch extending parallel to axis A. In any case, the first blade tool is configured for sequentially separating strip shaped portions 400 from an unrolled portion of plastic film 3, while the second blade tool is configured for making cuts or notches, over the unrolled portion of plastic film 3, perpendicularly to the axis A. In particular the second blade tool may include a plurality of tools arranged perpendicular to the axis A and configured for defining, in cooperation with the first blade tool, the plurality of film sheets 5 from a same plastic strip shaped portion 400.

Figure 5A:
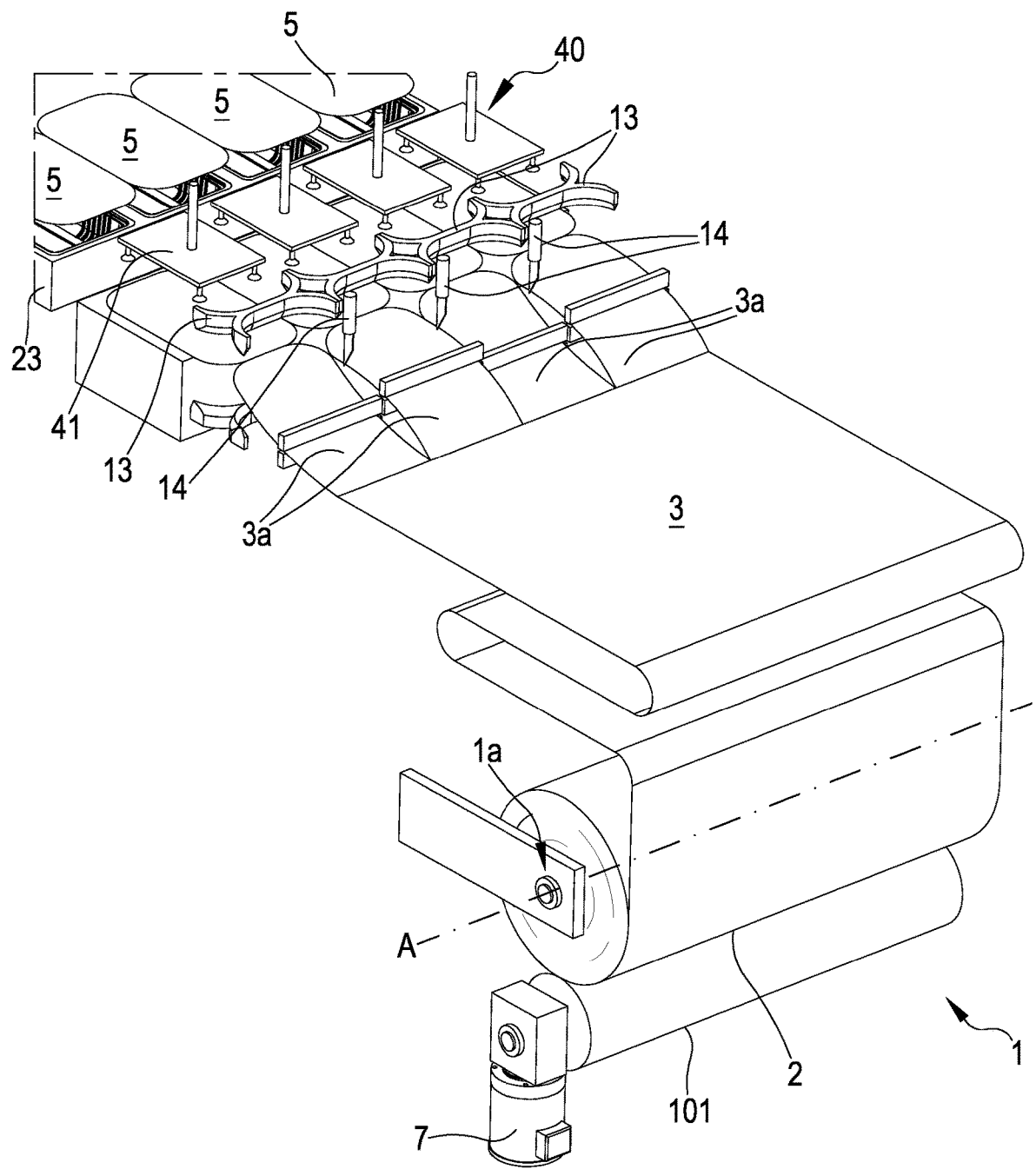
FIG. 5A shows a variant of the apparatus of FIG. 5: in particular in the apparatus of FIG. 5A uses one or more cutters configured to form rectangular or square film sheets with 45° bevelled or arched corners.

In currently preferred configurations shown in FIG. 1, 5, 5A, the apparatus 100 comprises a plurality of second blade tools 14 arranged upstream with respect to the first blade tool 13: in such configuration, the cutting procedure comprises first making, on the unrolled portion of plastic film 3, cuts or notches perpendicular to the unwinding axis A by means of the plurality of second blade tools 14 to form a plurality of ribbons 3a, and then making further cuts or notches, on the plurality of ribbons 3a, parallel to the unwinding axis A by means of the first blade tool 13. As shown in FIGS. 1, 5, 5A the cutting station 10 may also comprise a guide 15 configured to offset ribbons 3a such that adjacent ribbons or ribbon portions are arranged on different paths. In practice, the guide cooperates with the second blade tools such that by imposing different trajectories to adjacent ribbons, separation is facilitated and guaranteed. In practice, guide 15 is configured to vertically and/or horizontally offset the ribbons 3a such that adjacent ribbons or ribbon portions are arranged on different and non-parallel lying paths. In the example of FIGS. 1, 5, 5A the guide is configured to vertically offset portions of adjacent the ribbons 3a such that adjacent ribbons take different trajectories at least for a portion of their path thereby, as mentioned, facilitating separation. The guide 15 of the example of FIG. 1 comprises a plurality of adjacent guide members or rollers 15a extending parallel to the unwinding axis A; each guide member or roller 15a is configured to be active on a respective of said ribbons or ribbon portions and is vertically and/or horizontally shifted with respect to an adjacent guide member or roller 15a. In the non-limiting example of FIG. 1, the plurality of guide rollers are positioned each one at a vertical height different from the height of the next adjacent roller, with the first and third roller being the same height and the second and fourth roller being at the same height vertically above the first and fourth roller, thereby forming a sequence of vertically alternated rollers. Of course the number of guide rollers is linked to the number of ribbons being formed and thus the fact that FIG. 1 shows four guide rollers 15a is merely exemplifying. Going back to the cut or notches and to the further cut of notches, it is to be noted that while the cut or notches oriented perpendicular to the unwinding axis A are generally straight, the further cut or notches may be straight (FIG. 5) or straight with terminal portions which are either inclined (e.g. at 45° relative to the same straight line) or rounded (e.g. in the form of an arc of circle); consequently, each of the film sheets 5 may present the shape of a rectangle or of a square (FIG. 5) or the shape of a rectangle or square with rounded corners or with corners formed by a joining edge at an angle (e.g. at) 45° relative to two adjacent sides the film sheet (as shown in FIG. 5A). The further cuts or notches may be obtained using a blade or a cutter (or first blade tool) 13 having straight conformation or operative along a straight line (as shown in FIG. 5) or using a blade or cutter 13 having a central straight major portion forming a straight cutting segment and opposite end portions forming inclined or curved cutting lines to thereby obtain film sheets in the form of rectangles or squares with rounded or inclined corner regions, as shown in FIG. 5A; in this second case each blade 13 may comprise a single central straight major portion and, at each of the two opposite end portions, two diverging inclined or curved cutting portions to thereby form at each cut the curved of inclined corner regions of adjacent film sheets 5. As it is visible in FIGS. 5 and 5A, the further cuts or notches are or have a major portion oriented parallel to the unwinding axis A. In alternative configurations shown in FIGS. 3 and 3A, the apparatus 100 comprises one second blade tool 14 arranged downstream with respect to the first blade tool 13: in such a configuration, the cutting procedure comprises first making, on the unrolled portion of plastic film 3, cuts or notches parallel to the unwinding axis A by means of the first blade tool 13 to form a strip 4, and then making cuts or notches, on the strip 4, perpendicular to the unwinding axis A by means of the second blade tool 14 to form the distinct film sheets 5. The cuts or notches parallel to the unwinding axis A, executed by the first blade tool 13, extend along the entire width of the unrolled portion of plastic film 3.

Figure 3A:
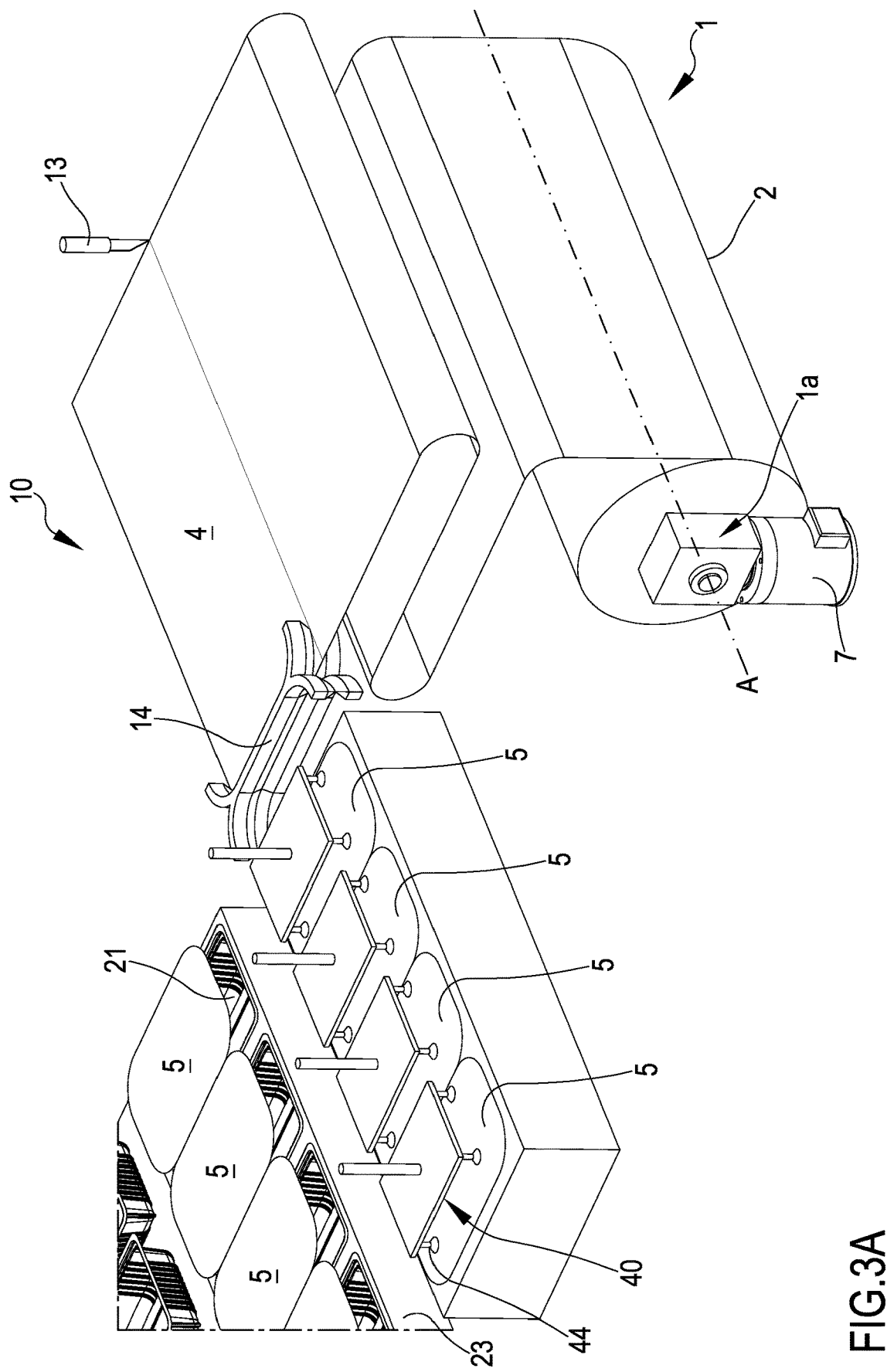
FIG. 3A shows a variant of the apparatus of FIG. 3: in particular in the apparatus of FIG. 3A uses one or more cutters configured to form rectangular or square film sheets with 45° bevelled or arched corners.

In the alternative configuration of FIGS. 3, 3A the strip 4 obtained by the first cut parallel to axis A is shifted parallel to the unwinding axis A towards the second blade tool 14 according to a stepwise motion, to then execute the cuts perpendicular to axis A. During the stepwise motion, strip 4 advances by steps equal to the width of each single film sheet 5. In practice, in the variants shown in FIGS. 3 and 3A, cuts or notches parallel to the unwinding axis A are made to form strip 4 and then further cuts or notches define the plurality of film sheets on each strip. In accordance with a possible optional form of execution, the shape of each one of said further cuts or notches may be that of a straight line (FIG. 3) or that of a straight line with terminal portions which are either inclined (e.g. bevelled at 45° relative to the same straight line) or rounded (e.g. in the form of an arc of circle as shown in FIG. 3A) such that each of the film sheets 5 presents the shape of a rectangle or of a square (FIG. 3) or that of a rectangle or square (FIG. 3A) with rounded corners or with bevelled corners formed by a joining edge at an angle (e.g. at 45°) relative to two adjacent sides the film sheet.

The further cuts or notches may be obtained using a blade or a cutter having straight conformation or operative along a straight line 14 (as shown in FIG. 3) which thus forms straight further cuts or notches and consequently film sheets in the form of perfect rectangles or squares; or a blade or cutter 14 having a central straight major portion forming a straight cutting segment and opposite end portions forming inclined or curved cutting lines to thereby obtain film sheets in the form of rectangles or squares with rounded or inclined corner regions, as shown in FIG. 3A; in this second case each blade 14 may comprise a single central straight major portion and, at each end portions) two diverging inclined or curved cutting portions to thereby form at each cut the curved of inclined corner regions of adjacent film sheets 5. It should be noted that the film (which is used to then obtain the trays or supports in the thermoforming station) is relatively thick and rigid and therefore it is particularly advantageous before effecting the further curt or notches perpendicular to the unwinding axis A having first obtained a strip of relatively short length to thereby use a blade or cutter 145 which has to carry out relatively short cuts and thus which can operate with reliability without imparting an excessive cutting force particularly when non-straight cuts need to be made (FIG. 3A).

The apparatus 100 may also comprise a thermoforming station 20 of a type as previously described for the first embodiment, wherein the plurality of moulds 21 are configured to receive the distinct film sheets 5 coming from the cutting station 10. In more detail, each mould 21 of the thermoforming station 20 is configured to receive a respective film sheet 5 coming from the cutting station 10. In order to make this possible, the cutting station 10 is configured to size the film sheets according to the moulds sizes, in such a way that each single film sheet 5 is sized to completely cover the longitudinal and lateral extension of the respective one of moulds 21. Since each mould 21 is configured to thermoform a single film sheet 5 to make a respective plastic support 6, the thermoforming station 20 outputs a plurality of distinct plastic supports 6, as shown in FIGS. 1, 3, 5 and 7.

The apparatus 100, according to the second embodiment, comprises a conveyor 40 presenting a first conveying line 41 configured to move each one of the plurality of film sheets 5 from the cutting station 10 to a respective mould in the thermoforming station 20. The first conveying line 41 comprises all the elements previously described for the first embodiment: the vacuum plate or a plurality of vacuum plates 44 or other transfer devices is/are configured to move the plurality of distinct film sheets 5 from the cutting station 10 towards the thermoforming station 20.

The apparatus 100 may comprise a packaging station 30 configured for receiving plastic supports 6 coming from the thermoforming station 20: the thermoforming station 30 has the same features as previously described for the first embodiment. In an alternative configuration wherein the apparatus 100 has no thermoforming station 20, the packaging station 30 is configured to receive the plurality of distinct plastic film sheets 5 directly coming from the cutting station 10.

The apparatus 100 according to the second embodiment comprises all the remaining features as previously described in the section related to the first embodiment.

Process of Making the Package 80

The process steps described below may all be controlled by the control unit 70 which is connected to the sensors described above and acts on the respective actuators or motors of the various stations in order to execute the process and process variants described below.

The process comprises a step of unrolling consecutive portions of plastic film 3 by turning the feed roll 2 around the respective unwinding axis A: the step of unrolling may comprise a step of controlling the motor 7 connected to the feed roll 2 to achieve a predetermined advancement of the plastic film 3.

The step of unrolling consecutive portions of plastic film 3 may also comprise advancing plastic film 3 by a length equal to the length of the strips 4 or of the strip shaped portion 400.

The process also comprises a step of performing the cutting procedure at the cutting station 10 for separating, from a portion of plastic film 3 unrolled by the feed roll 2, the strip 4 of plastic film 3 having a width W and a length L, respectively measured parallel and perpendicular to the unwinding axis A, wherein the width of the strip 4 is larger than the length thereof.

Alternatively, the process comprises a step of performing the cutting procedure at the cutting station 10 for separating, from an unrolled portion of plastic film 3, a plurality of distinct film sheets 5 obtained from a same strip shaped portion 400 of plastic film 3. The strip shaped portion 400 has a width W and a length L, respectively measured parallel and perpendicular to the unwinding axis A, wherein the width of the strip shaped portion 400 is larger than the length thereof.

According to a configuration, the cutting procedure performed by the cutting station 10 comprises making, on the unrolled portion, at least one cut or notch parallel to the unwinding axis A to obtain a strip 4, as shown in FIG. 2: in particular the cut or notch extends along the entire width of the unrolled portion of plastic film 3.

The cutting procedure may comprise making on the strip 4, one or more cuts or notches perpendicular to the unwinding axis A of the feed roll 2, to form the plurality of film sheets 5. The step of making the perpendicular cuts may occur after the step of making the parallel cuts as shown in FIG. 3.

Alternatively, the process comprises a slightly different cutting procedure in order to obtain the distinct film sheets 5: in particular the cutting procedure comprises making, on the unrolled portion, first one or more cuts or notches perpendicular to the unwinding axis A of the feed roll 2 to form the plurality of ribbons 3a (see FIG. 1), and then, acting on the plurality of ribbons, making one or more cuts or notches parallel to the unwinding axis A. The parallel cuts or notches extend along the entire width of the unrolled portion of plastic film 3 to define the plurality of film sheets 5.

The step of performing the cutting procedure is triggered by a step of evaluating at least one between an advancement of the plastic film 3, an angular rotation of the feed roll 2, an angular speed of the feed roll 2, an angular acceleration of the feed roll 2. The step of performing the cutting procedure may also be triggered by a step of evaluating the presence of the leading edge of the unrolled portion of plastic film 3 at a target position. Once the unrolled portion presents a predetermined length or once the leading edge of the unrolled portion reaches the target position, the step of performing the cutting procedure starts.

The process also comprises a step of moving the strip 4 or the plurality of film sheets 5 from the cutting station 10 to the thermoforming station 20 by a first conveying line 41. The step of moving the strip 4 or the plurality of film sheets 5 may comprise the step of defining a pressure lower than the atmosphere pressure at a vacuum plate of the first conveying line 41, in order to allow the vacuum plate to engage with the strip 4 or the plurality of film sheets 5.

According to a preferred configuration, the process comprises a step of thermoforming the strip 4 or each sheet of the plurality of distinct film sheets 5 by means of the plurality of moulds 21 of the thermoforming station 20. The thermoforming step defines the plurality of plastic supports 6. The thermoforming step comprises a step of moving the upper and the lower tools 22, 23 of the thermoforming station 20 from the open position, wherein the strips 4 or the plurality of film sheets 5 are allowed to enter the thermoforming station 20, to the close position, wherein the strips 4 or the plurality of film sheets 5 are subjected to the thermoforming step.

The process may comprise a step of moving the plastic supports 6 from the thermoforming station 20 to the packaging station 30, through the additional supplying station 110 and the filling station 120, by the second conveying line 42.

The process also comprises a step of sequentially placing one or more products P on the plastic supports 6 at the filling station 120: this step is synchronized with the movement of the plastic supports 6 transported by the second conveying line 42, such that when a plastic support 6 is at the filling station 120, the step of placing a product on the plastic support 6 is triggered. Alternatively, in the apparatus configuration wherein the apparatus 100 does not comprise any thermoforming station 20, the filling station 120 carries out the step of placing products directly over the strip 4 or over the distinct film sheets 5 coming from the cutting station 10.

The process may also comprise a step of supplying top plastic film 9 at the additional supplying station 110, wherein this step comprises either providing distinct film sheets 9a of plastic film 9 or unrolling a continuous web of plastic film from the feed roll 8 of the additional supplying station 110.

The process may also comprise a step of packaging at least one product P positioned on at least one between the strip 4, distinct film sheets 5 or plastic supports 6. The step of packaging comprises a step of engaging at least one between the strip 4, distinct film sheets 5 or plastic supports 6 with the plastic film 9 provided by the additional supplying station 110, defining the sealed package 80.

The step of packaging may also comprise a step of removing air between the plastic support 6 and the plastic film 9 provided by the additional supplying station 110, to define a vacuum package 80. Alternatively, the step of packaging may comprise a step of insufflating air between the plastic support 6 and the plastic film 9 provided by the additional supplying station 110, to define a modified atmosphere package 80.

The invention claimed is:

1. An apparatus comprising:
   a supplying station comprising a roll support configured to receive a feed roll and to rotate the feed roll around an unwinding axis to unroll consecutive portions of plastic film;
   a cutting station configured to perform a cutting procedure comprising separating, from an unrolled portion of plastic film coming from the feed roll, at least one of:
      a strip of plastic film having a width, measured parallel to the unwinding axis, and a length, measured perpendicular to the unwinding axis, wherein the width of said strip is larger than the length of the strip; or
      a plurality of distinct film sheets obtained from a same strip shaped portion of plastic film, said strip shaped portion having a width, measured parallel to the unwinding axis, and a length, measured perpendicular to the unwinding axis, wherein the width of said strip shaped portion is larger than the length of the same strip shaped portion;
   a thermoforming station comprising a plurality of adjacent molds configured to:
      receive the strips or the plurality of distinct film sheets, and
      thermoform said strips or said plurality of distinct film sheets in order to form a plurality of plastic supports; and
   a packaging station configured to close in a package at least one product positioned on at least one between said strips, film sheets or plastic supports;
   wherein the packaging station is arranged downstream with respect to the thermoforming station along a machine direction of transportation of the plastic supports to the packaging station;
   wherein the unwinding axis of the feed roll is parallel to the machine direction; and
   wherein the cutting station is configured to make, on the unrolled portion, one or more cuts or notches perpendicular to the unwinding axis of the feed roll to form a plurality of ribbons.

2. The apparatus of claim 1, wherein said width is larger than the radius of the feed roll.

3. The apparatus of claim 1, wherein the thermoforming station is provided with the plurality of molds sequentially arranged to form at least one line of molds positioned along a thermoforming direction, which is oriented parallel to the feed roll unwinding axis.

4. The apparatus of claim 3, wherein the cutting procedure, which the cutting station is configured to execute, is designed such that:
   the width of the strips of plastic film is sized to completely cover the longitudinal extension, in the thermoforming direction, of said line of molds; and
   the length of the strips of plastic film is sized to completely cover the lateral extension, perpendicularly to the thermoforming direction, of said line of molds.

5. The apparatus of claim 1, comprising at least one conveyor configured to move the strips or the plurality of distinct film sheets from the cutting station to at least one between:
   the thermoforming station, and
   the packaging station.

6. The apparatus of claim 5, further comprising:
   a packaging station configured for closing in a package at least one product positioned on at least one between said strips, film sheets or plastic supports;
   wherein the conveyor comprises a second conveying line, arranged between the thermoforming station and the packaging station, configured to move the plastic support from the thermoforming station to the packaging station, wherein said second conveying line is configured to move the plastic supports parallel to the machine direction.

7. The apparatus of claim 1, further comprising an additional supplying station, arranged between the thermoforming station and the packaging station, said additional supplying station being configured to provide consecutive portions of top plastic film to the packaging station to package the at least one product.

8. The apparatus of claim 7, wherein the additional supplying station comprises a feed roll configured to rotate around a respective unwinding axis to unroll consecutive portions of plastic film in the form of a continuous web, said continuous web being configured to engage with the plastic supports to define a sealed package containing the at least one product, the plastic film of the additional supplying station having a thickness lower than the one of the plastic film provided by the supplying station; or
wherein the additional supplying station is configured to provide consecutive portions of plastic film in the form of distinct film sheets, said distinct film sheets being configured to engage with the plastic supports to define a sealed package containing the at least one product, the plastic film of the additional supplying station having a thickness lower than the one of the plastic film provided by the supplying station.

9. The apparatus of claim 1, wherein the cutting procedure, performed by the cutting station, comprises making, on the unrolled portion, at least one cut or notch parallel to the unwinding axis of the feed roll,
said cut or notch extending along the entire width of the unrolled portion of plastic film to define said strip.

10. The apparatus of claim 1, wherein the cutting procedure performed by the cutting station comprises first making, on the unrolled portion, at least one cut or notch parallel to the unwinding axis of the feed roll, said cut or notch extending along the entire width of the unrolled portion of plastic film to define said strip, and then making on said strip, one or more further cuts or notches having a major part perpendicular to the unwinding axis of the feed roll.

11. The apparatus of claim 10, wherein said further cuts or notches define said plurality of film sheets on each strip, and wherein the shape of each one of said further cuts or notches is that of a straight line or that of a straight line with terminal portions which are either inclined or rounded such that each of the film sheets presents one of:
a shape of a rectangle,
a shape of a square,
a shape of a rectangle with rounded corners or with corners formed by a joining edge at an angle relative to two adjacent sides the film sheet, or
a shape of a square with rounded corners or with corners formed by a joining edge at an angle relative to two adjacent sides the film sheet.

12. The apparatus of claim 10, wherein the further cuts or notches are obtained using:
a blade or a cutter having straight conformation or operative along a straight line; or
a blade or cutter having a central straight major portion and, at each end portion two diverging inclined or curved cutting portions to thereby form at each cut the curved of inclined corner regions of adjacent film sheets.

13. A method of manufacturing supports or packages using the apparatus of claim 1, comprising:
unrolling consecutive portions of plastic film by rotating the feed roll around the respective unwinding axis;
performing the cutting procedure at the cutting station for separating, from a portion of plastic film unrolled by the feed roll either:
a strip of plastic film having a width, measured parallel to the unwinding axis, and a length, measured perpendicular to the unwinding axis, wherein the width of said strip is larger than the length of the same strip; or
a plurality of distinct film sheets obtained from a same strip shaped portion of plastic film, said strip shaped portion having a width, measured parallel to the unwinding axis, and a length, measured perpendicular to the unwinding axis, wherein the width of said strip shaped portion is larger than the length of the same strip shaped portion;
thermoforming said strip or said plurality of distinct film sheets by means of the plurality of molds of the thermoforming station, to define a plurality of plastic supports;
wherein the cutting procedure performed by the cutting station comprises making, on the unrolled portion, one or more cuts or notches perpendicular to the unwinding axis of the feed roll to form a plurality of ribbons.

14. The method of claim 13, wherein:
the cutting procedure performed by the cutting station further comprises making, on the unrolled portion, at least:
on said plurality of ribbons, one or more further cuts or notches having a major part parallel to the unwinding axis of the feed roll, said cuts or notches extending along the entire width of the unrolled portion of plastic film to define said plurality of film sheets.

15. The method of claim 14, wherein said further cuts or notches are achieved using a blade or cutter having a central straight major portion forming a straight cutting segment and opposite end portions forming inclined or curved cutting lines to thereby obtain film sheets in the form of rectangles or squares with rounded or inclined corner regions.

16. The method of claim 13, wherein the step of unrolling consecutive portions of plastic film comprises advancing plastic film by a length equal to the length of the strips or of the strip shaped portion.

17. The method of claim 13, further comprising:
moving the strips or the plurality of distinct film sheets from the cutting station to the thermoforming station along first conveying line arranged between the cutting station and the thermoforming station;
extracting the plastic supports from each of the molds of the thermoforming station;
placing at least one product on the plastic support;
moving, according to the machine direction, the plastic supports from the thermoforming station to a packaging station along second conveying line arranged between the thermoforming station and the packaging station.

18. The method of claim 13, wherein the packaging procedure comprises:
providing a continuous web of plastic film unrolled from feed roll or distinct plastic film sheets by additional supplying station;
engaging the plastic supports or the strips or the distinct film sheets with said continuous web of plastic film or distinct plastic film sheets provided by the additional supplying station, in order to form a sealed package,
the step of engaging following the step of placing the at least one product on the plastic support.

* * * * *